(12) United States Patent
Allen

(10) Patent No.: US 12,370,828 B1
(45) Date of Patent: Jul. 29, 2025

(54) AXLE WITH OUTER SLEEVE AND ELECTRIC VEHICLES HAVING AXLE WITH OUTER SLEEVE

(71) Applicant: Float Supply, LLC, Sacramento, CA (US)

(72) Inventor: Robert Allen, Sacramento, CA (US)

(73) Assignee: Float Supply, LLC, Sacramento, CA (US)

( * ) Notice: Subject to any disclaimer, the term of this patent is extended or adjusted under 35 U.S.C. 154(b) by 0 days.

(21) Appl. No.: 18/954,550

(22) Filed: Nov. 21, 2024

(51) Int. Cl.
| B60K 1/04 | (2019.01) |
| B60B 27/00 | (2006.01) |
| B60B 27/02 | (2006.01) |
| B60B 35/00 | (2006.01) |

(52) U.S. Cl.
CPC ........ B60B 35/004 (2013.01); B60B 27/0073 (2013.01); B60B 27/02 (2013.01)

(58) Field of Classification Search
CPC .... B60B 35/004; B60B 27/0073; B60B 27/02
See application file for complete search history.

(56) References Cited

U.S. PATENT DOCUMENTS

| 7,811,217 | B2* | 10/2010 | Odien | A63C 17/12 |
| | | | | 482/34 |
| 9,101,817 | B2* | 8/2015 | Doerksen | G01P 15/18 |
| 9,211,470 | B2* | 12/2015 | Bigler | B62J 50/22 |
| 9,452,345 | B2* | 9/2016 | Doerksen | A63C 17/01 |
| 9,598,141 | B1* | 3/2017 | Doerksen | H02K 5/02 |
| 9,643,077 | B2* | 5/2017 | Bigler | A63C 17/014 |
| 9,908,580 | B2* | 3/2018 | Doerksen | B62J 45/41 |
| 9,956,491 | B2* | 5/2018 | McCafferty | A63H 29/20 |
| 9,962,597 | B2* | 5/2018 | Doerksen | B62K 25/00 |
| 10,010,784 | B1* | 7/2018 | Doerksen | B62D 51/02 |
| 10,456,658 | B1* | 10/2019 | Doerksen | G01C 19/42 |
| 11,273,364 | B1* | 3/2022 | Doerksen | A63C 17/12 |
| 11,745,087 | B1* | 9/2023 | Jennings | A63C 17/26 |
| | | | | 280/87.041 |
| 11,890,528 | B1* | 2/2024 | Doerksen | A63C 17/0046 |
| 12,187,373 | B1* | 1/2025 | De La Rua | A63C 17/262 |
| 2022/0396330 | A1* | 12/2022 | Doerksen | B62K 25/04 |

* cited by examiner

*Primary Examiner* — Jason D Shanske
*Assistant Examiner* — James J Triggs
(74) *Attorney, Agent, or Firm* — Renner, Otto, Boisselle & Sklar, LLP

(57) ABSTRACT

An axle for a motor includes a first portion extending from a first end to a second end. The first portion defines a first length of an interior passage extending from a first aperture proximate the first end. The first portion defines the first aperture at a first aperture distance from the central axis. A second portion extends from a third end to a fourth end and surrounds a length of the first portion. At least one of the first portion or the second portion defines a second length of the interior passage extending from a second aperture proximate the second end. The second aperture is defined at a second aperture distance from the central axis. The second aperture distance is greater than the first aperture distance. A first mounting structure is located proximate the first end and a second mounting structure is located proximate the second end.

20 Claims, 18 Drawing Sheets

AXLE WITH OUTER SLEEVE AND ELECTRIC VEHICLES HAVING AXLE WITH OUTER SLEEVE

TECHNICAL FIELD

The present disclosure relates to an axle that may be used in a one-wheeled vehicle. The axle may be configured to permit passage of an object through the axle from a first end of the axle to an aperture away from the first end of the axle. The axle may be configured to permit passage of an electronic control cable from the first end of the axle and through a portion of the axle to an aperture away from the first end of the axle.

BACKGROUND

Hub motors such as, for example, those used in one-wheeled vehicles, can, at times, present challenges to repair and replacement of one or more electronic control cables connected to a stator or other electronics related to the hub motor. In some examples, an electronic control cable passes into a space within an axle of the hub motor. A relatively short radius turn or bend in the electronic control cable is required to fasten a portion of the electronic control cable to the stator or other electronics related to the hub motor. The relatively short radius turn can lead to increased time, labor, and expense of repair tasks, increased difficulty of sealing a gap between the axle interior space and the electronic control cable, and other undesired effects. The relatively short radius turn may also force a sharp bend of the relevant cables, which may increase mechanical strain on those cables and may lead to increased failure.

SUMMARY

Although maintenance or replacement of electronic control cables in hub motors of electric vehicles occurs from time to time, many known designs of single-wheeled electric vehicles are not designed and manufactured to enable repair or replacement of the electronic control cable in a cost-effective manner. As noted, in some examples, the electronic control cable passes into a space within an axle of the hub motor of the single-wheeled electric vehicle. The space is defined at a first end of the axle, and the electronic control cable is in electrical communication with (e.g., connected to) the stator on a side of the stator nearest the first end of the axle. This arrangement requires the electronic control cable to bend approximately 90 degrees to exit the axle through an aperture. The aperture is often located a relatively short distance from the first end of the axle, thus requiring a relatively short length wire bend radius for the electronic control cable to exit the axle through the aperture. As a result, repairing or replacing the electronic control cable can be time consuming and require disassembly of a majority of the electric vehicle, thus limiting the potential to repair or replace the electronic control cable. In some instances, replacement of the electronic control cable is cost prohibitive.

An aspect according to the present disclosure provides an axle for a hub motor enabling the electronic control cable to pass through a passage defined by the axle from the first end of the axle toward an opposing second end. The electronic control cable can exit the passage generally toward the second end of the axle. In this arrangement, the electronic control cable passes from a first side of the hub motor, through a central volume of the hub motor, to a second side of the hub motor where the electronic control cable can be connected to the stator.

Generally, the axle for the hub motor can provide the passage for the electronic control cable to enable a greater bend radius of the electronic control cable to facilitate repair or replacement operations of the electronic control cable. More particularly, according to an aspect of the present disclosure, an axle for a motor includes a first portion extending along a central axis from a first end to a second end. The first portion includes a first exterior surface at a first distance from the central axis, and the first portion defines a first length of an interior passage extending from a first aperture proximate the first end. The first portion defines the first aperture at a first aperture distance from the central axis. The axle also includes a second portion extending along the central axis from a third end proximate the first end of the first portion to a fourth end proximate the second end of the first portion. The second portion surrounds a length of the first portion and has a second exterior surface at a second distance from the central axis. The second distance is greater than the first distance. At least one of the first portion or the second portion defines a second length of the interior passage extending from a second aperture proximate the second end of the first portion. The second aperture is defined at a second aperture distance from the central axis. The second aperture distance is greater than the first aperture distance. The first aperture is in fluid communication with the second aperture such that a volume outside the first end of the first portion is in fluid communication with a volume outside the fourth end of the second portion through the interior passage. The interior passage is defined by at least one of the first portion and the second portion. The axle further includes a first mounting structure located proximate the first end of the first portion. The axle still further includes a second mounting structure located proximate the second end of the first portion.

An aspect according to the present disclosure provides an axle and a sleeve surrounding the axle to enable the electronic control cable to pass through a passage defined by the axle and the sleeve together. The electronic control cable passes through the axle and sleeve combination from the first end of the axle toward the opposing second end of the axle. The electronic control cable can exit the passage generally toward the second end of the axle such that the electronic control cable passes from a first side of the hub motor to an opposing second side through a central aperture defined by the hub motor.

More particularly, according to another aspect of the present disclosure, an axle for a motor includes an axle member extending along a central axis from a first end to a second end. The axle member includes a first exterior surface at a first distance from the central axis and defines a first passage extending from a first axle aperture defined at the first end of the axle member toward a second axle aperture defined at the first exterior surface. The axle also includes a sleeve extending along the central axis from a third end proximate the first end of the axle member to a fourth end proximate the second end of the axle member. The sleeve surrounds an axial length of the axle member. The sleeve includes an interior surface and a second exterior surface at a second distance from the central axis. The second distance is greater than the first distance. The second axle aperture is defined between the third end of the sleeve and the second end of the axle member such that the first passage passes through the axle member for at least a portion of the axial length between the third end of the sleeve and the fourth end of the sleeve. The axle further includes a first mounting structure located proximate the first end of the axle member. The axle still further includes a second mounting structure located proximate the second end of the axle member.

Some embodiments of the present disclosure include a section of the passage that is generally not parallel to the central axis to provide a relatively smooth and a relatively long radius curve for the electronic control cable as it passes to the second side of the motor (e.g., a hub motor). The axle can also include a seal and a cap configured to apply a force to the seal to seal a gap or a space between the electronic control cable and a surface of the passage.

An aspect according to the present disclosure provides an electric vehicle including an axle that defines a passage through at least a portion of the axle enabling an electronic control cable to pass from a first end of the axle toward a second end of the axle. The electronic control cable passes through the axle from the first end of the axle toward the opposing second end of the axle. The electronic control cable can exit the passage generally toward the second end of the axle such that the electronic control cable passes from a first side of the hub motor to an opposing second side through a central aperture defined by the hub motor.

More particularly, according to another aspect of the present disclosure, an electric vehicle includes a board frame. The board frame includes a chassis, first deck portion, and second deck portion. The chassis supports the first deck portion and the second deck portion, each deck portion configured to receive a left or right foot of a rider oriented generally perpendicular to a direction of travel of the board. The electric vehicle also includes a hub motor configured to rotate a ground-contacting wheel to propel the electric vehicle. The hub motor defines a central aperture extending along a central axis from a first side to a second side. The electric vehicle further includes an axle member attached to the hub motor. The axle member extends along the central axis within the central aperture from a first end to a second end. The axle defines a passage extending from a first axle aperture defined at the first end of the axle member toward a second axle aperture defined at a surface between the first end and the second end. The first axle aperture is defined at a first distance from the central axis, and the second axle aperture is defined at a second distance from the central axis. The second distance is greater than the first distance. The electric vehicle further includes a first hub motor frame mount attached to the first end of the axle member. The electric vehicle includes a second hub motor frame mount attached to the second end of the axle member. The first hub motor frame mount and the second hub motor frame mount attach the board frame to the axle member and the hub motor.

The following description and the annexed drawings set forth certain illustrative embodiments of the disclosure. These embodiments are indicative, however, of but a few of the various ways in which the principles of the disclosure may be employed. Other objects, advantages and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects of the motor axle and its use.

DETAILED DESCRIPTION

Figure 1:
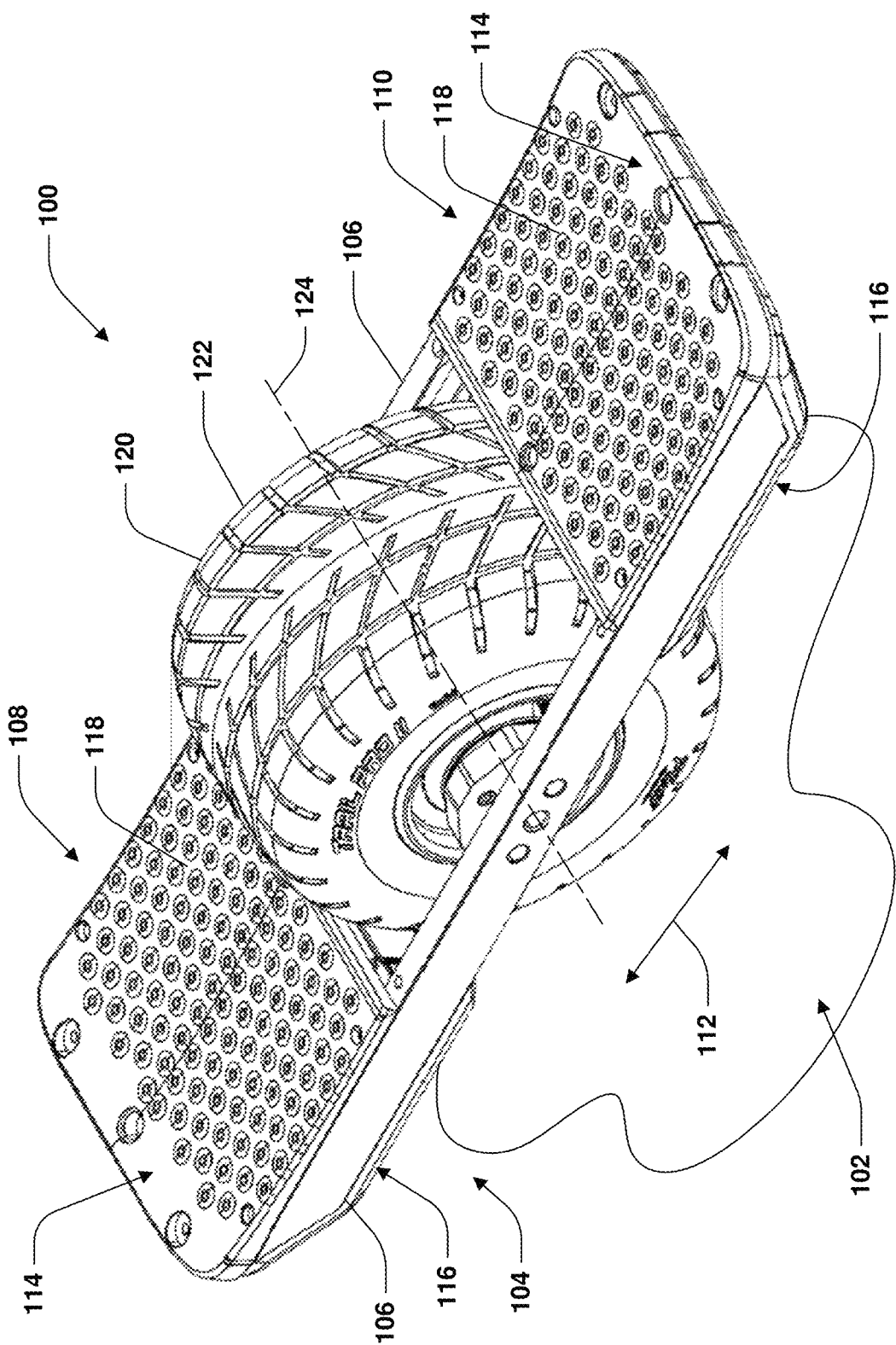
FIG. 1 is a perspective view of an electric vehicle including a ground-contacting wheel located between two deck portions.

While the described apparatus and methods can take many different forms, for the purpose of promoting an understanding of the principles of the disclosure, reference will now be made to the embodiments illustrated in the drawings and specific language will be used to describe the same. It will nevertheless be understood that no limitation of the scope of the disclosure is thereby intended.

Generally, the present disclosure is directed to an apparatus and methods that provide greater ability to repair and replace hub motor components. These hub motor components can include an axle, whether it is a unitary axle or a multi-piece axle. The repair and replacement of hub motor components may include the axle or may include other parts that require removal of the axle from the hub motor in order to properly repair or replace the component. In some examples, the hub motor provides motive force for a single-wheeled electric vehicle, and the remainder of the disclosure will focus on the axle as a portion of a hub motor for a single-wheeled vehicle, although this is merely one example of use for the axle, and other axle implementations are also contemplated.

Referring initially to FIG. 1, an electric vehicle 100 is shown on a ground surface 102. The ground surface 102 can include any number of suitable surfaces including, but not limited to, concrete, asphalt, grass, dirt, gravel, etc. The electric vehicle 100 can include a board frame 104 having a chassis 106, a first deck portion 108, and a second deck portion 110. At times, the first deck portion 108 and the second deck portion 110 are together referred to as a "board" or a "deck." The chassis 106 supports the first deck portion 108 and the second deck portion 110, with each of the first deck portion 108 and the second deck portion 110 configured to receive a left or right foot of a rider oriented generally perpendicular to a direction of travel of the electric vehicle 100. The direction of travel is represented in FIG. 1 by arrow 112.

Each of the first deck portion 108 and the second deck portion 110 can include an upward-facing surface 114 and a downward-facing surface 116. The first deck portion 108 and the second deck portion 110 can define an interior volume (not shown), and each interior volume can contain batteries, electronic controllers, and other components (not shown) used to power and control the electric vehicle 100. Components not involved in power and control operations of the electric vehicle 100 can also be located within the interior volume of the deck portions 108, 110 as needed. Additionally, the first deck portion 108 and the second deck portion 110 can each include a footpad sensor 118 on the upward-facing surface 114.

A rotatable, ground-contacting wheel 120 is disposed between the first deck portion 108 and the second deck portion 110. The chassis 106 along with the first deck portion 108 and the second deck portion 110 can be said to surround the ground-contacting wheel 120 of the electric vehicle 100. In some examples, as the example shown in FIG. 1, the ground-contacting wheel 120 extends above and below the first deck portion 108 and the second deck portion 110. In other words, the ground-contacting wheel 120 extends above the upward-facing surface 114 and below the downward-facing surface 116. It is to be understood that the ground-contacting wheel 120 can include a tire 122 such as a pneumatic tire or a non-pneumatic tire as so desired. The ground-contacting wheel 120 can rotate about a central axis 124.

Figure 2:
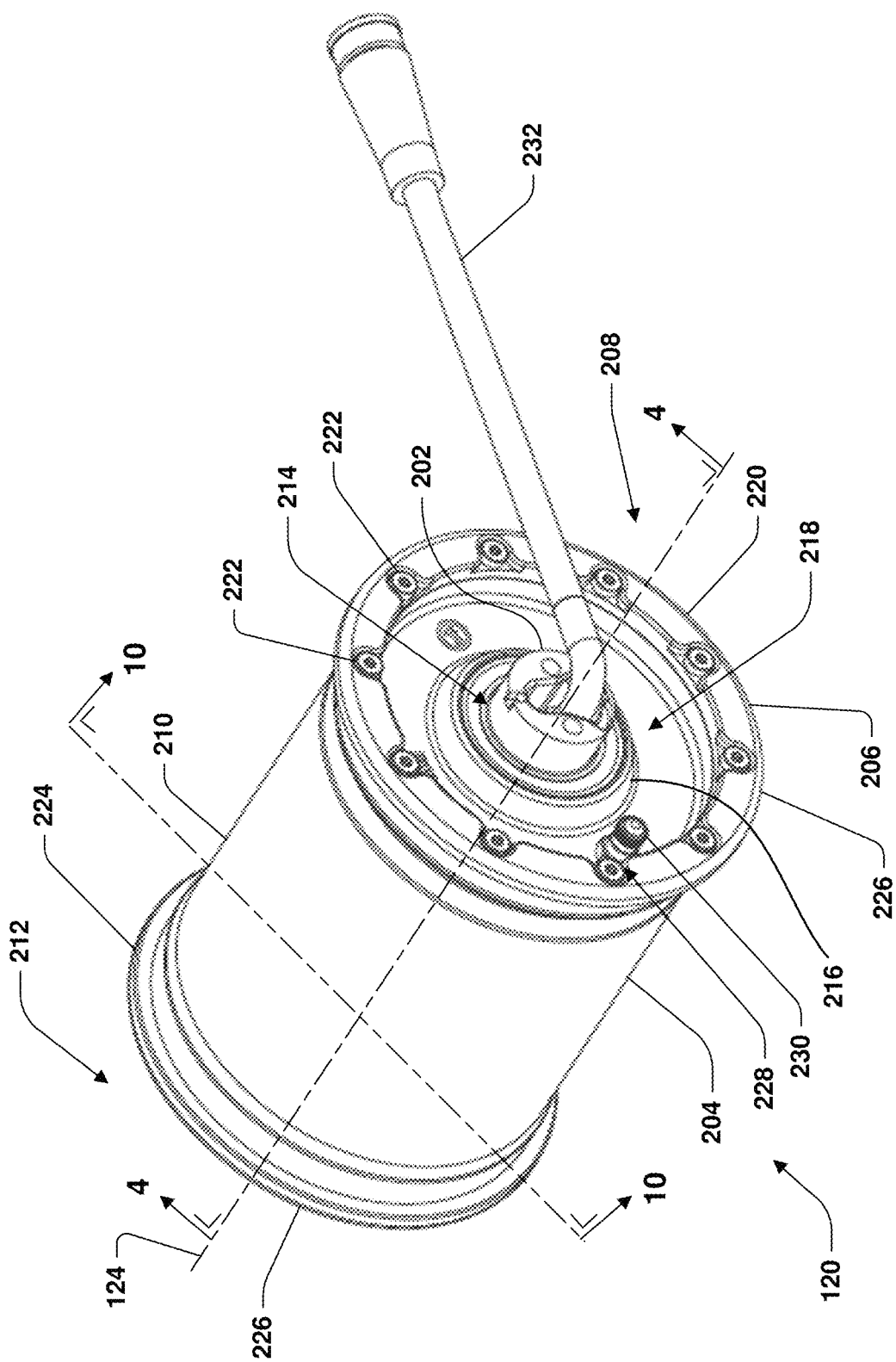
FIG. 2 is a perspective view of a hub motor and an axle located within the ground-contacting wheel of FIG. 1 with an electronic control cable.

Referring to FIG. 2, a hub motor 200 (shown in FIG. 6) and an axle 202 located within the ground-contacting wheel 120 are illustrated. Some components of the electric vehicle 100 are not shown in FIG. 2 for clarity. The ground-contacting wheel 120 contains or houses the hub motor 200 (not shown in FIG. 2) within an interior volume defined by a hub 204. The interior volume can be centered about the central axis 124. The hub 204 can take any suitable form or shape to contain the hub motor 200. In the shown example, the hub 204 has a bowl-shaped form including an enclosing portion 206 on a first side 208 of the hub motor 200. The enclosing portion 206 forms a generally closed end of the hub 204 and is attached to a cylindrical portion 210 extending away from the enclosing portion 206 toward a second side 212 of the hub motor 200. The second side 212 of the hub motor 200 is on a side facing away from the viewer in FIG. 2. In some examples, the enclosing portion 206 and the cylindrical portion 210 are unitary, and the cylindrical portion 210 defines a generally open end facing the second side 212 of the hub motor 200. During assembly and disassembly operations, the hub motor 200 and other components may be inserted into and removed from the interior volume of the hub 204 through the open end of the hub 204.

The enclosing portion 206 defines a central aperture 214 enabling a portion of the axle 202 to extend from the interior volume to a space exterior to the hub 204. In some examples, the enclosing portion 206 includes a protrusion 216 extending away from an exterior surface 218 of the enclosing portion 206. The protrusion 216 can be centered about both the central axis 124 and the central aperture 214. The protrusion 216 can provide a space within the interior volume in which a bearing or similar structure can be used to attach the axle 202 to the hub 204.

Remaining with FIG. 2, a hub rim 220 is attached to the hub 204 where the enclosing portion 206 meets the cylindrical portion 210. The hub rim 220 can have a generally annular shape and a portion of the hub rim 220 can surround at least a portion of the hub 204. The hub rim 220 can be attached to the hub 204 in any suitable manner, including with a plurality of screws 222 arranged in a bolt circle as shown in FIG. 2. Similarly, a hub plate 224 can be selectively attached to the hub 204 on the second side 212 of the hub motor 200. The hub plate 224 can define a second central aperture enabling a portion of the axle 202 to extend from the interior volume to a space exterior to the hub 204 on the second side 212 of the hub motor 200. The hub plate 224 can also be selectively attached to the hub 204 in any suitable manner, including, but not limited to, a plurality of screws arranged in a bolt circle. The hub plate 224 can generally cover the open end of the hub 204 on the second side 212 of the hub motor 200. The hub plate 224 can reduce or eliminate entry of moisture, dirt, and other undesirable material to the interior volume defined by the hub 204. It is to be understood that some examples of the electric vehicle 100 can include a hub 204 that includes a cylindrical portion 210 that is generally open on both the first side 208 and the second side 212 of the hub motor 200. In these examples, there may be a second hub plate located on the first side 208 of the hub motor 200 instead of the enclosing portion 206. In this example, the hub plate 224 and the second hub plate each attach to the hub 224 at separate ends of the hub 204 to generally enclose the hub motor 200 within the interior volume of the hub 204.

Both the hub rim 220 and the hub plate 224 can include an annular portion 226 extending radially away from the central axis 124. The tire 122 (shown in FIG. 1) can be selectively mounted to the hub 204 while the annular portion 226 of the hub rim 220 and the annular portion 226 of the hub plate 224 maintain a position of the tire 122 (shown in FIG. 1) relative to a direction parallel to the central axis 124. In other words, the annular portions 226 of the hub rim 220 and the hub plate 224 help prevent sideways motion of the tire 122 when the tire 122 is mounted to the hub 204. The hub 204, the hub rim 220, and the hub plate 224 can be constructed of relatively rigid materials designed to withstand expected loading requirements of typical electric vehicles of this type and perform within expected standards during the design life of the electric vehicle.

While not required, the enclosing portion 206 can also define an aperture 228 providing fluid communication between the space exterior to the hub 204 and the interior volume of the hub 204. A one-way pneumatic valve 230 can be attached to the enclosing portion 206 of the hub 204 to provide a structure to selectively open and close the aperture 228. While not shown, the aperture 228 and the valve 230 can be connected to a pathway that leads to an enclosed space within the tire 122. The described pathway and valve 230 can be used to selectively inflate and deflate the tire 122 in those examples that include a pneumatic tire.

Remaining with FIG. 2, an electronic control cable 232 can span a distance between the interior volume of the hub 204 and an interior volume (not shown) of at least one of the first deck portion 108 or the second deck portion 110. The electronic control cable 232 can be connected to a stator or other electronics related to the hub motor 200, pass through the axle 202, pass into at least one of the first deck portion 108 or the second deck portion 110, and connect to components within the interior volume of at least one of the first deck portion 108 or the second deck portion 110. The electronic control cable 232 can provide electrical communication between the previously discussed batteries, electronic controllers, and other components within the deck portions 108, 110 and the stator or other electronics related to the hub motor 200.

Figure 3:
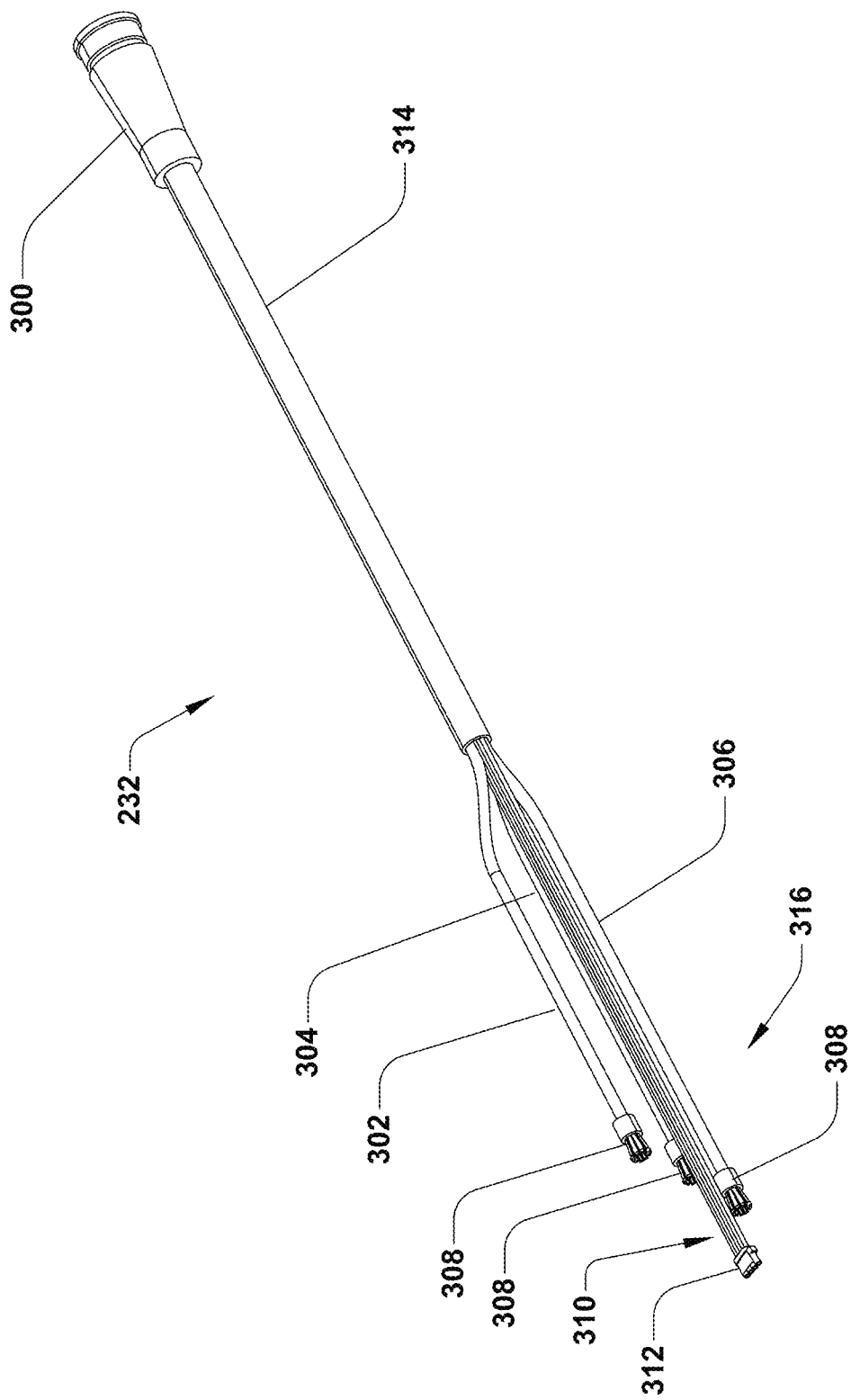
FIG. 3 is a detail view of the electronic control cable of FIG. 2.

Referring to FIG. 3, a detailed view of the electronic control cable 232 of FIG. 2 is illustrated. The electronic control cable 232 can include multiple strands of wires or wiring. As previously noted, the electronic control cable 232 can pass from the interior volume of at least one of the first deck portion 108 or the second deck portion 110 (shown in FIG. 1), through the axle 204, and into the interior volume of the hub 204. While not necessary, the electronic control cable 232 can include a connector 300 that can provide a single connection to one or more components within the interior volume of the deck portions 108, 110 for each of the wires within the electronic control cable 232. For example, the connector 300 may connect to a cooperating connector on a printed circuit board (PCB) within the interior volume of the deck portions 108, 110. The connector 300 can reduce the time and effort required to assemble and disassemble various components of the electric vehicle 100.

In some examples, the electronic control cable 232 can include a first wire 302 for a first phase winding of the stator of the hub motor 200. Similarly, a second wire 304 and a third wire 306 for the second phase and third phase stator windings, respectively, can also be included in the electronic control cable 232. Each of the wires 302, 304, 306 can terminate in a bullet connector 308 (e.g., a male bullet connector) to provide ease of connection of the wires 302, 304, 306 to the stator or other electronics related to the hub motor 200.

Additionally, the electronic control cable 232 can include a number of other controls-related wires 310. For example, the controls-related wires 310 can include one or more wires configured to connect to a temperature sensor associated with the hub motor 200. The controls-related wires 310 can also include a number of wires configured to connect to one or more Hall switches associated with the hub motor 200. In some examples, the controls-related wires 310 all terminate at a connector 312. The connector 312 is configured to attach to a cooperating connector located on a PCB attached to the hub motor 200. As with other described connectors in this disclosure, the connector 312 can reduce the amount of time and effort of assembly and disassembly of the electric vehicle 100. A sheath 314 or protective covering can surround the wires 302, 304, 306, 310 to provide organization and a level of protection of the wires 302, 304, 306, 310. The grouping of the wires 302, 304, 306, 310 near their termination ends and their connectors 308, 312 can be considered an end portion 316 of the electronic control cable 232.

Figure 4:
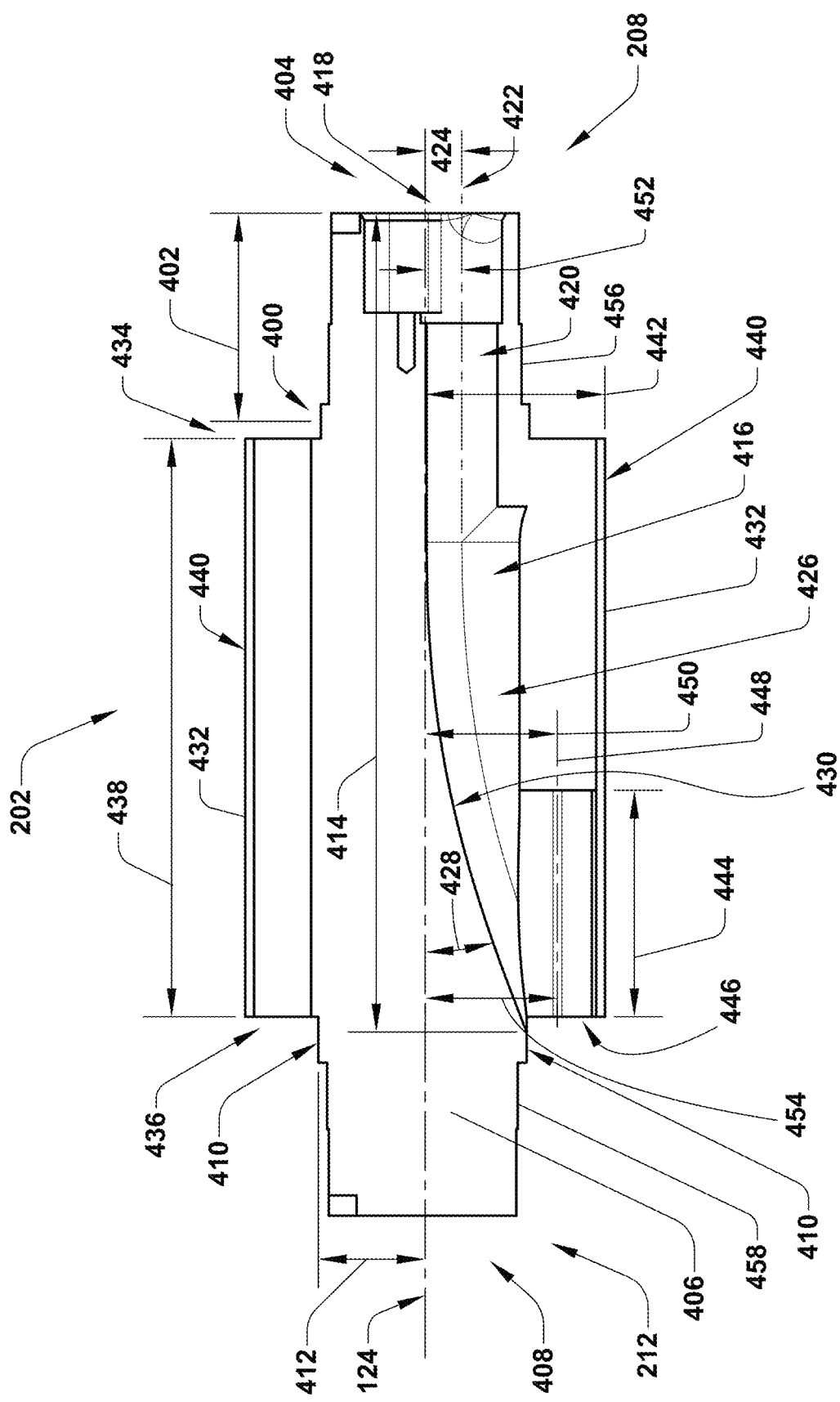
FIG. 4 is a cross-section view of a first embodiment of the axle of FIG. 2 taken along line 4-4 of FIG. 2.

Referring to FIG. 4, a cross-section view of a first embodiment of the axle 202 taken along line 4-4 of FIG. 2 is illustrated. In some previously known examples of electric vehicles, an electronic control cable similar to the electronic control cable 232 (shown in FIG. 3) would enter an aperture in the axle located at the first side 208 of the hub motor 200. The electronic control cable of some known devices is electrically connected to the stator on a side of the stator facing the first side 208 of the hub motor 200. This arrangement requires the electronic control cable to bend approximately 90-degrees to exit the axle through a side aperture at a location at or near arrow pointer 400. The side aperture is often located a relatively short distance 402 from a first end 404 of the axle, thus requiring a relatively short length radius of curvature to exit the axle through the side aperture.

In some of these known examples, the electronic control cable having the described 90-degree bends with a relatively short radius can yield several undesirable effects. In some examples, the group of wires within the electronic control cable may have material properties that resist conforming to the required short radius, 90-degree bend. In some examples, the electronic control cable may have geometric properties (e.g., large diameters) that resist conforming to the required short radius, 90-degree bend. In some examples, connectors at the ends of the wires making up the electronic control cable may be too large to pass through the side aperture. In some examples, the total cross-sectional area of the wires making up the electronic control cable may be too large to pass through the side aperture. In some examples, even if all the wires of the electronic control cable are passed through the side aperture, a desired seal between the wires and the side aperture is likely difficult to seal. This seal application difficulty often results in placement of a relatively large amount of glue or other time-hardening material into and around the side aperture. In some examples, the time-hardened material increases the amount of time, labor, and expense of several repair and maintenance tasks. As a result, some owners of electric vehicles simply purchase new electric vehicles to avoid the substantial costs of repair or maintenance. Other electric vehicle owners may pay for new parts and scrap old parts that may not require replacement; however, the existing parts cannot be adequately serviced while the electronic control cable is glued or sealed to the axle.

Remaining with FIG. 4, axle 202 includes a first portion 406 extending along the central axis 124 from the first end 404 to a second end 408. The first portion 406 of the axle 202 defines a first exterior surface 410 at a first distance 412 from the central axis 124. In some examples, the first exterior surface 410 is cylindrical. The first portion 406 of the axle 202 defines a first length 414 of an interior passage 416 extending from a first aperture 418 at the first end 404 of the axle 202.

In some examples, the first portion 406 of the axle 202 defines two individual sections of the first length 414 of the interior passage 416. A first section 420 of the first length 414 of the interior passage 416 extends along a centerline 422 that is parallel to the central axis 124. In some examples, the centerline 422 is separated by a distance 424 from the central axis 124. It is to be appreciated that in some examples, the centerline 422 may be colinear with the central axis 124, resulting in the distance 424 being equal to zero.

The first portion 406 also defines a second section 426 of the first length 414 of the interior passage 416 as extending away from the central axis 124. As shown in FIG. 4, the first portion 406 can define the second section 426 as having a non-linear or curvilinear path away from the central axis 124. In some examples, the first portion 406 can define the second section 426 as having a linear path extending away from the central axis 124. The second section 426 extends away from the central axis 124 and terminates at its intersection with the first exterior surface 410, if the first exterior surface 410 extended through the axle 202.

Regardless of whether the first portion 406 defines the second section 426 as having a non-linear path or a linear path away from the central axis 124, the second section 426 may be described as extending away from the central axis 124 at an angle 428 relative to the central axis 124. FIG. 4 shows a measurement of the angle 428 from the central axis 124 to a tangent line of a curvilinear interior surface 430 of the second section 426 defined by the first portion 406 of the axle 202. The angle 428 could also be measured from the central axis 124 to a center line of a second section 426 that has a linear path (not shown) or other suitable measurement locations. In some examples, the angle 428 can be between about 10 degrees and about 20 degrees. In some examples, the angle 428 can be between about 12 degrees and about 18 degrees. In some examples, the second section 426 of the first length 414 of the interior passage 416 extends away from the central axis 124 at the angle 428 of about 15 degrees.

The axle 202 also includes a second portion 432 extending along the central axis 124 from a third end 434 proximate the first end 404 of the first portion 406 to a fourth end 436 proximate the second end 408 of the first portion 406. The second portion 432 surrounds a length 438 of the first portion 406. The second portion 432 defines a second exterior surface 440 at a second distance 442 from the central axis 124. The second distance 442 is greater than the first distance 412. In some examples, the second exterior surface 440 is cylindrical. The second exterior surface 440 can be configured to cooperate with an interior surface of the stator of the hub motor 200. In some examples, the second exterior surface 440 can be configured to have a press fit or a friction fit with the stator, although this is not required, and any other suitable tolerance regime is satisfactory.

Additionally, at least one of the axle 202 or the stator can include structure to prevent rotational motion of the axle 202 relative to the stator such as a key and keyway combination, non-circular cross-sections, etc. In this way, a rotational position of the axle 202 about the central axis 124 relative to the stator is clocked. In other words, when assembled, the axle 202 and the stator have a constant rotational position relative to one another.

The second portion 432 defines a second length 444 of the interior passage 416 extending from a second aperture 446 at the fourth end 436 of the second portion 432. In some examples, the second portion 432 defines the second length 444 of the interior passage 416 extending along a centerline 448 parallel to the central axis 124. The centerline 448 is separated by a distance 450 from the central axis 124. The distance 450 between the centerline 448 of the second length 444 of the interior passage 416 is greater than the distance 424 between the centerline 422 of the first section 420 of the first portion 406 from the central axis 124.

The first portion 406 defines the first aperture 418 at a first aperture distance 452 from the central axis 124. In some examples, this first aperture distance 452 is equal to the distance 412 as shown in FIG. 4, but this is not necessarily the case. Similarly, the second portion 432 defines the second aperture 446 at a second aperture distance 454 from the central axis 124. In some examples, this second aperture distance 454 is equal to the distance 450, but this is not required. The second aperture distance 454 is greater than the first aperture distance 452.

As shown in FIG. 4, the first length 414 of the interior passage 416 is in fluid communication with the second length 444 of the interior passage 416. In other words, the segment of the interior passage 416 defined by the first portion 406 of the axle 202 is open (i.e., not closed off) to the segment of the interior passage 416 defined by the second portion 432 of the axle 202. As such, the first aperture 418 is in fluid communication with the second aperture 446 such that a volume outside the first end 404 of the first portion 406 is in fluid communication with a volume outside the fourth end 436 of the second portion 432. The fluid communication is maintained through the interior passage 416 defined in part by the first portion 406 and in part by the second portion 432 of the axle 202. It is worthy of note that, as shown in FIG. 2 and additional figures, the volume outside the first end 404 of the axle 202 is outside the hub 204 and the volume outside the fourth end 436 is located within the hub 204 (e.g., within the interior volume defined by the hub 204). As such, the electronic control cable 232 (shown in FIG. 3) can be passed from the volume outside the first end 404 of the axle 202 to the interior volume defined by the hub 204 where wires 302, 304, 306, 310 can be electrically connected to components of the hub motor 200. For the purposes of this disclosure, the term "the volume outside the first end" can include structures and volumes located on the first side 208 of the hub motor 200 (shown in FIG. 2). For example, "the volume outside the first end" can include structures and volumes located where the electronic control cable 232 has not yet entered the first aperture 418 of the axle 202. The term "the volume outside the fourth end" can include structures and volumes located where portions of the electronic control cable 232 has exited the second aperture 446. For example, "the volume outside the fourth end can include structures and volumes located outside of the axle 202 but within the hub 204.

Remaining with FIG. 4, the axle 202 can also define a first mounting structure 456 located proximate the first end 404 of the first portion 406. The first mounting structure 456 can be a cylindrical exterior surface configured to cooperate with a first bearing to enable rotatable attachment of the axle 202 to at least one of the hub motor 200 or the hub 204. Similarly, the axle 202 can also define a second mounting structure 458 located proximate the second end 408 of the first portion 406. The second mounting structure 458 can be a cylindrical exterior surface configured to cooperate with a second bearing to enable rotatable attachment of the axle 202 to at least one of the hub motor 200 or the hub 204.

In some examples, the axle 202 as shown in FIG. 4 can be a unitary structure that is formed from a single piece of material. Some benefits may be derived from forming the axle 202 from a single piece of material, however, designers and manufacturers may require particular consideration of potential manufacturing methods, such as additive manufacturing, use of five-axis machining centers, or other suitable methods.

Figure 5:
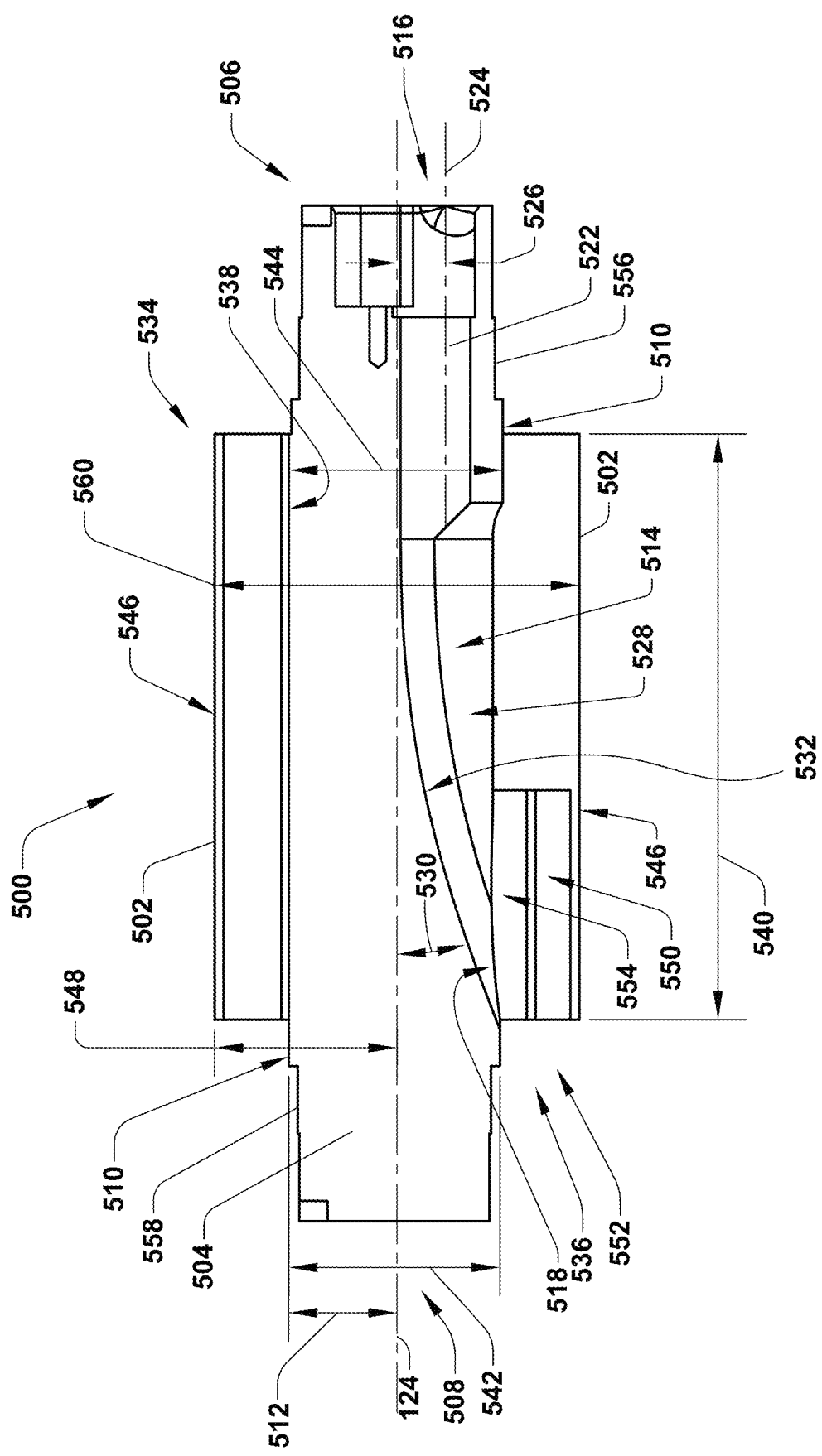
FIG. 5 is a cross-section view of a second embodiment of the axle of FIG. 2 and an outer sleeve taken along line 4-4.

Referring to FIG. 5, a cross-section view of a second embodiment of an axle 500 for use with the hub 204 and hub motor 200 of FIG. 2 is illustrated with a separate outer sleeve 502. The axle 500 includes an axle member 504 extending along the central axis 124 from a first end 506 to a second end 508. The axle member 504 defines a first exterior surface 510 at a first distance 512 from the central axis 124. In some examples, the first exterior surface 510 of the axle member 504 is cylindrical such that the first distance 512 is a radius measurement (e.g., a radius of a cylinder). The axle member 504 defines a first passage 514 extending from a first axle aperture 516 defined at the first end 506 of the axle member 504 toward a second axle aperture 518 defined at the first exterior surface 510 between the first end 506 and the second end 508. The first passage 514 can be defined by the same geometry as described above in reference to the first portion 406 of axle 202.

As a review of potential geometric configurations of the first passage 514, the axle member 504 of the axle 500 defines two individual sections of the first passage 514. A first section 522 of the first passage 514 extends along a centerline 524 that is parallel to the central axis 124. In some examples, the centerline 524 is separated by a distance 526 from the central axis 124. It is to be appreciated that in some examples, the centerline 524 may be colinear with the central axis 124, resulting in the distance 526 being equal to zero.

The first passage 514 also defines a second section 528 as extending away from the central axis 124. As shown in FIG. 5, the axle member 504 can define the second section 528 as having a non-linear or curvilinear path away from the central axis 124. In some examples, the axle member 504 can define the second section 528 as having a linear path extending away from the central axis 124. The second section 528 extends away from the central axis 124 and terminates at the second axle aperture 518 defined by the first exterior surface 510.

Regardless of whether the axle member 504 defines the second section 528 as having a non-linear path or a linear path extending away from the central axis 124, the second section 528 may be described as extending away from the central axis 124 at an angle 530 relative to the central axis 124. FIG. 5 shows a measurement of the angle 530 from the central axis 124 to a tangent line of a curvilinear interior surface 532 of the second section 528 defined by the axle member 504. The angle 530 could also be measured from the central axis 124 to a center line of a second section 528 that has a linear path (not shown) or other suitable measurement locations. In some examples, the angle 530 can be between about 10 degrees and about 20 degrees. In some examples, the angle 530 can be between about 12 degrees and about 18 degrees. In some examples, the second section 528 of the first passage 514 extends away from the central axis 124 at the angle 530 of about 15 degrees.

The axle 500 also includes the sleeve 502 extending along the central axis 124 from a third end 534 proximate the first end 506 of the axle member 504 to a fourth end 536 proximate the second end 508 of the axle member 504. The sleeve 502 can be described as having an annular configuration. The sleeve 502 defines an interior surface 538 having the same or a similar cross-sectional shape as the cross-section of the first exterior surface 510 of the axle member 504. In some examples, the interior surface 538 of the sleeve 502 defines a cylindrical space into which the axle member 504 is located. The interior surface 538 of the sleeve 502 and the first exterior surface 510 of the axle member 504 are configured to cooperate with each other such that the sleeve 502 fits around and surrounds an axial length 540 of the axle member 504 as shown in FIG. 5.

In some examples, the first exterior surface 510 is defined by an outside diameter 542 (e.g., twice the first distance 512) of the axle member 504, and the interior surface 538 of the sleeve 502 is defined by an inside diameter 544. The outside diameter 542 and the inside diameter 544 can be configured to enable a friction fit or a press fit attachment of the sleeve 502 to the axle member 504. The press fit or friction fit is not required, and any other suitable tolerance regime is satisfactory. In some examples, particular benefits can be derived from limiting or eliminating motion of the sleeve 502 relative to the axle member 504. It is to be understood that other structures or methods can be employed to limit or prevent this relative motion, including, but not limited to, a key and a cooperating keyway in at least one of the sleeve 502 or the axle member 504, forming at least one of the first exterior surface 510 or the interior surface 538 to have a non-circular cross-section, etc. These described structures can prevent rotational motion of the axle member 504 relative to the sleeve 502 such that the two structures are clocked. In other words, when assembled, the axle member 504 and the sleeve 502 have a constant rotational position relative to one another.

The sleeve 502 defines a second exterior surface 546 at a second distance 548 from the central axis 124. The second distance 548 is greater than the first distance 512. A difference between the second distance 548 and the first distance 512 can be considered to approximate a thickness of the sleeve 502. As with the axle 202 shown in FIG. 4, the axle member 504 and the sleeve 502 can be constructed of relatively rigid materials designed to withstand expected loading requirements of typical electric vehicles of the disclosed type and perform within expected standards during the design life of the electric vehicle.

The second axle aperture 518 is defined between the third end 534 of the sleeve 502 and the second end 508 of the axle member 504 such that the first passage 514 passes through the axle member 504 for at least a portion of the axial length 540 between the third end 534 of the sleeve 502 and the fourth end of the sleeve 502.

The associated electronic control cable 232 (shown in FIG. 3) can pass through the axle member 504 from the first axle aperture 516 to the second axle aperture 518 where the associated electronic control cable 232 can exit the first passage 514 of the axle member 504. In some examples, as shown in FIG. 5, the associated electronic control cable 232 can then pass into a portion of the sleeve 502 if the axial length 540 of the sleeve 502 extends over the second axle aperture 518. It is to be understood that in some other examples, the axial length 540 of the sleeve 502 does not extend over the second axle aperture 518 as will be shown in FIG. 15 and described below. Regardless of whether the axial length 540 of the sleeve 502 extends over the second axle aperture 518, the associated electronic control cable 232 can pass through an axial length of at least one of the axle 202, the axle member 504, or the sleeve 502 to pass from the first side 208 of the hub motor 200 to the second side 212 of the hub motor 200. This arrangement can help minimize or eliminate the undesired effects of a short radius bend in the associated electronic control cable 232 required for the associated electronic control cable 232 to exit the axle 202 at or near the arrow pointer location 400 shown in FIG. 4.

Remaining with FIG. 5, the sleeve 502 can define a second passage 550 extending from a first sleeve aperture 552 defined at the fourth end 536 toward a second sleeve aperture 554 defined at the interior surface 538. The sleeve 502 and the axle member 504 are aligned such that the second axle aperture 518 cooperates with the second sleeve aperture 554. The cooperation (e.g., alignment) between the apertures 518, 554 provides or enables fluid communication through and/or between the first passage 514 and the second passage 550. As such, there is fluid communication between the first axle aperture 516 defined at the first end of the axle member 504 and the first sleeve aperture 552 defined at the fourth end 536 of the sleeve 502.

Similar to the axle 202 shown in FIG. 4, the first passage 514 and the second passage 550 are configured to enable the associated electronic control cable 232 (shown in FIG. 3) to pass through the axle member 504 and the sleeve 502 from the first axle aperture 516 to the first sleeve aperture 552. As such, the first axle aperture 516 is in fluid communication with the first sleeve aperture 552 such that a volume outside the first end 506 of the axle member 504 is in fluid communication with a volume outside the fourth end 536 of the sleeve 502. The fluid communication is maintained through an interior passage defined in part by the first passage 514 defined by the axle member 504 and in part by the second passage 550 defined by the sleeve 502.

It is worthy of note that, as shown in FIG. 2 and additional figures, the volume outside the first end 506 of the axle member 504 is outside the hub 204 and the volume outside the fourth end 536 of the sleeve 502 is located within the hub 204 (e.g., within the interior volume defined by the hub 204). As such, the electronic control cable 232 (shown in FIG. 3) can be passed from the volume outside the first end 506 of the axle member 504 to the interior volume defined by the hub 204 where wires 302, 304, 306, 310 can be electrically connected to components of the hub motor 200. In some examples, the first passage 514 and the second passage 550 are configured to enable the associated electronic control cable 232 to pass through the axle member 504 and the sleeve 502 to provide electrical communication between an electrical signal source located in a space exterior to the first axle aperture 516, and an electrical connector located in a space exterior to the first sleeve aperture 552 or in a space exterior to the second axle aperture 518.

For the purposes of this disclosure, the terms "the volume outside the first end" and "a space exterior to the first axle aperture" can include structures and volumes located on the first side 208 of the hub motor 200 (shown in FIG. 2). For example, "the volume outside of the first end" can include structures and volumes located where the electronic control cable 232 has not yet entered the first aperture 418 of the axle 202. The terms "the volume outside the fourth end" and "a space exterior to the first sleeve aperture" can include structures and volumes located where portions of the electronic control cable 232 has exited the second aperture 446. For example, "the volume outside the fourth end" can include structures and volumes located outside of the axle 202 but within the hub 204.

Remaining with FIG. 5, the axle member 504 can also define a first mounting structure 556 located proximate the first end 506. The first mounting structure 556 can be a cylindrical exterior surface configured to cooperate with a first bearing to enable rotatable attachment of the axle member 504 to at least one of the hub motor 200 or the hub 204. Similarly, the axle member 504 can also define a second mounting structure 558 located proximate the second end 508 of the axle member 504. The second mounting structure 558 can be a cylindrical exterior surface configured to cooperate with a second bearing to enable rotatable attachment of the axle member 504 to at least one of the hub motor 200 or the hub 204.

In some examples, the second exterior surface 546 is defined by an outside diameter 560 (e.g., twice the second distance 548) of the sleeve 502, and the stator of the hub motor 200 has an inside diameter. The outside diameter 560 of the sleeve 502 and the inside diameter of the stator can be configured to enable a friction fit or a press fit attachment of the sleeve 502 to the stator. The press fit or friction fit is not required, and any other suitable tolerance regime is satisfactory. In some examples, particular benefits can be derived from limiting or eliminating motion of the sleeve 502 relative to the stator. It is to be understood that other structures or methods can be employed to limit or prevent this relative motion, including, but not limited to, a key and a cooperating keyway in at least one of the sleeve 502 or the stator, forming at least one of the second exterior surface 546 or the interior surface of the stator to have a non-circular cross-section, etc. These described structures can prevent rotational motion of the sleeve 502 relative to the stator such that the two structures are clocked. In other words, when assembled, the sleeve 502 and the stator have a constant rotational position relative to one another.

The axle 500 including the axle member 504 and the sleeve 502 can include many of the same details, geometry, and spatial relationships as a single-piece axle 202 of FIG. 4, and these details can be understood to be the same if not described in regard to axle 500 or shown in FIG. 5.

Figure 6:
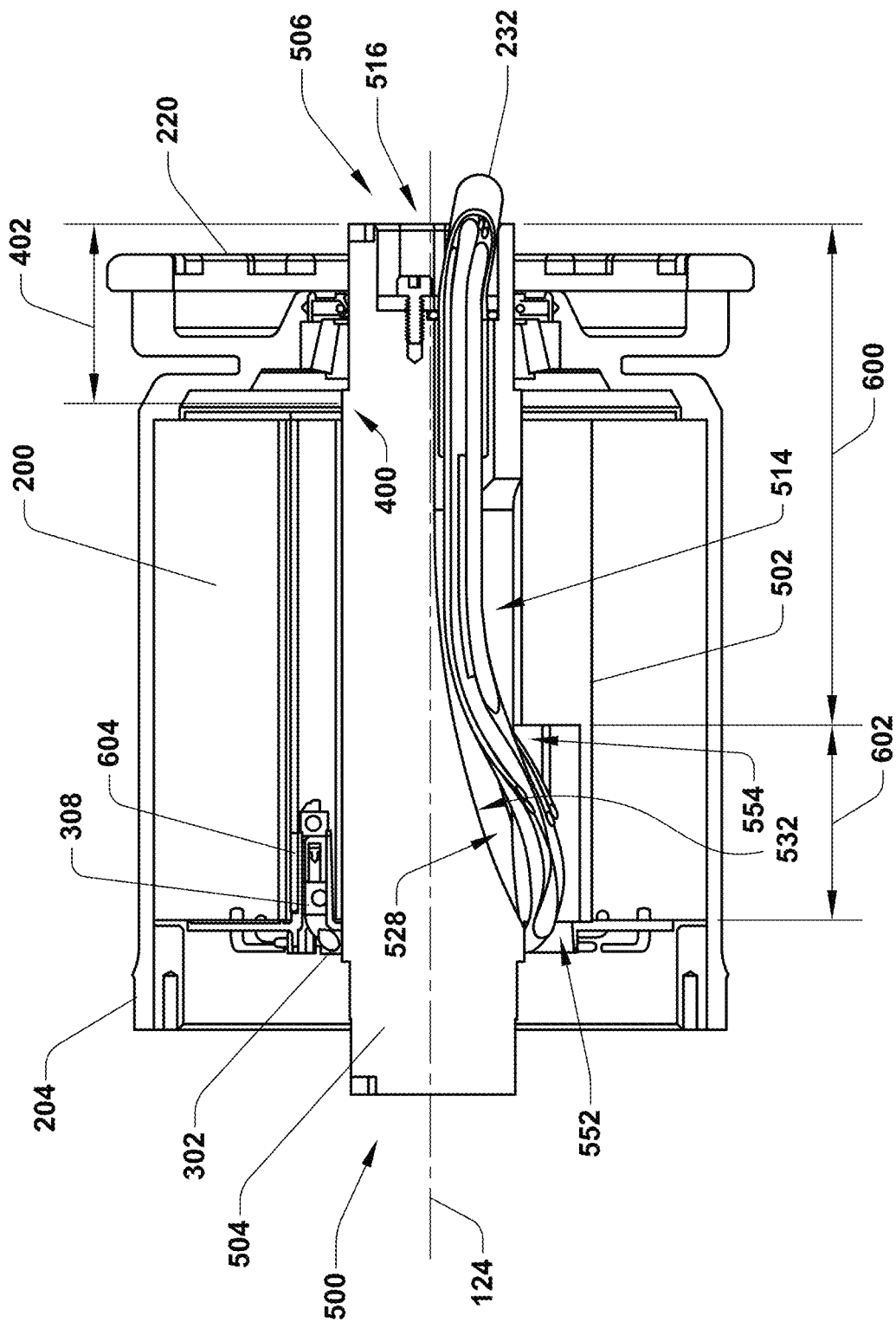
FIG. 6 is similar to FIG. 5 showing the axle within the hub motor and the electronic control cable passing through an aperture defined by the axle and the outer sleeve.

Referring to FIG. 6, a cross-section view of the axle 500 and the sleeve 502 within the hub 204 is illustrated. the hub motor 200, and the electronic control cable 232 passing through the first passage 514 defined by the axle member 504 and the outer sleeve 502 is illustrated. The remainder of the disclosure and the figures will describe and show the axle 500 in conjunction with other components of the electric vehicle 100, however, the axle 500 can be interchangeably replaced with the axle 202 to yield the same or a similar electric vehicle 100.

The electronic control cable 232 is shown entering the first passage 514 defined by the first axle member 504 after passing through the first axle aperture 516. As previously discussed, the axle member 504 can define the second section 528 as having a non-linear or curvilinear path away from the central axis 124. In some examples, the axle member 504 can define the curvilinear interior surface 532 of the second section 528 as a curved surface having a relatively long radius of curvature. The interior surface 532 can be described as a gentle curve.

Additionally, the second sleeve aperture 554 is defined by the sleeve 502 as located a distance 600 from the first end 506 of axle member 504. The distance 600 from the first end 506 can be relatively long compared to the relatively short distance 402 of some known side apertures in some known electric vehicle axle components. Furthermore, the second sleeve aperture 554 is defined by the sleeve 502 as having a relatively long dimension 602 in an axial direction parallel to the central axis 124. As shown in FIG. 6, the dimension 602 can be several times longer than a diameter dimension of the electronic control cable 232.

The combination of several aspects of the disclosed structural features can significantly reduce the required time, effort, and cost of passing the electronic control cable 232 from a space exterior to the first axle aperture 516, through the axle 500, and into a space exterior to the first sleeve aperture 552. This described ease of passing of the electronic control cable 232 through the axle 500 is generally applicable to assembly, disassembly, and maintenance operations. The disclosed structural features can include, but are not limited to: a) the gentle curve of the interior surface 532; b) the relatively long axial dimension 602 of the second sleeve aperture 554 compared to known side apertures; and c) the relatively long distance 600 compared to the relatively short distance 402 of some known side apertures. Combinations of two or more of these structures and possible additional structures enable a significantly greater radius of curvature for the electronic control cable 232 to pass out of the axle 500 because of at least one of the following factors.

First, the relatively long distance over which the electronic control cable 232 spans between the first axle aperture 516 and the aperture through which the electronic control cable 232 exits the axle 500 (distance 600 compared to distance 402). The relatively long distance 600 enables a more gradual curve of the electronic control cable 232 to exit the first passage 514.

Second, the relatively long axial dimension 602 of the second sleeve aperture 554 (dimension 602 compared to known diameters of known side apertures 400). Some side apertures have diameters that are on the order of the diameter of the electronic control cable 232. The relatively long axial dimension 602 of the second sleeve aperture 554 enables the electronic control cable 232 to pass through the second sleeve aperture 554 at an angle significantly less than 90 degrees as shown in FIG. 6. This exit angle of significantly less than 90 degrees lessens the required angle of bend in the electronic control cable 232 to exit the first passage 514.

Third, the relatively long radius of curvature of the curvilinear interior surface 532 defined by the second section 528 can help form the bend or curve of the electronic control cable 232 to be a gentle or sweeping curve. Additional structures and methods may also be used alone or in combination with the above structures to further facilitate the insertion of, removal of, and maintenance of the electronic control cable 232.

Remaining with FIG. 6, the electronic control cable 232 can be placed around the axle member 504 as shown where individual wires 302, 304, 306, 310 can be connected to the appropriate connection locations in the hub motor 200, such as the stator. For example, wire 302 as shown in FIG. 6 can terminate in a male bullet connector 308 which, in turn, is connected to a female bullet connector 604 in the hub motor 200. This is one example of how the electronic control cable 232 can provide electrical communication between the previously discussed batteries, electronic controllers, and other components within the deck portions 108, 110 and the hub motor 200. In some examples, the wire 302 provides electrical communication between electronic controller(s) within the deck portions 108, 110 and a set of stator windings of one phase of a three-phase hub motor.

Figure 7:
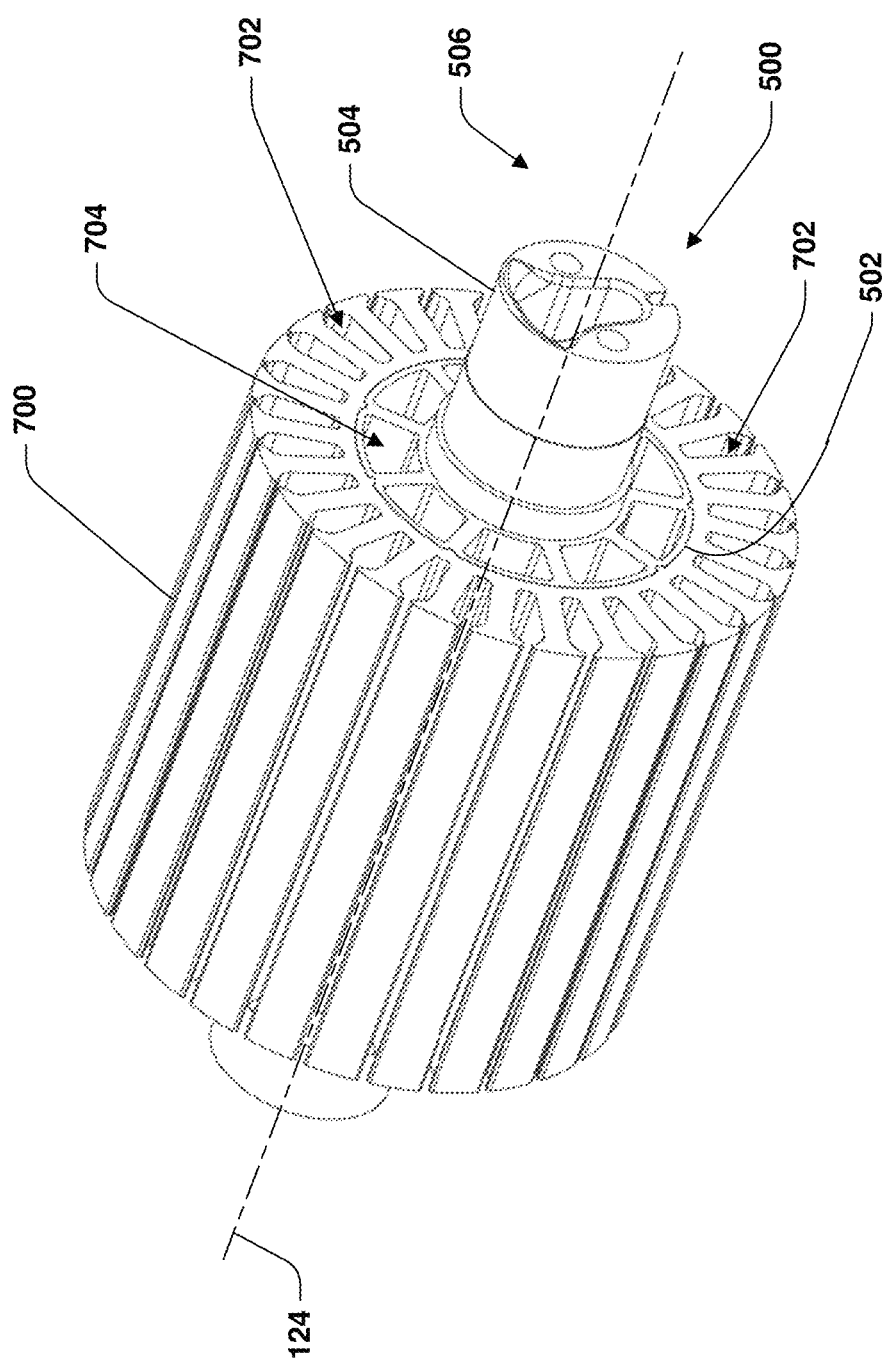
FIG. 7 is a detail view of the axle and the outer sleeve located within a stator of the hub motor of FIG. 2, the view taken from a first side of the hub motor.

Referring to FIG. 7, a detailed view of the axle member 504 and the outer sleeve 502 located within a stator 700 of the hub motor 200 is illustrated. The view is taken from the first side 506 of the axle member 504. For clarity, the stator 700 is shown without the windings normally found wound around and through the various axial passages 702 of the stator 700. Each of the axle member 504, the outer sleeve 502, and the 700 are centered about the central axis 124. In some examples, the sleeve 502 can include enclosed, axial passages 704 to promote heat exchange, lighten the electric vehicle 100, etc. The axial passages 704 can be radially arranged around the central axis 124.

Figure 8:
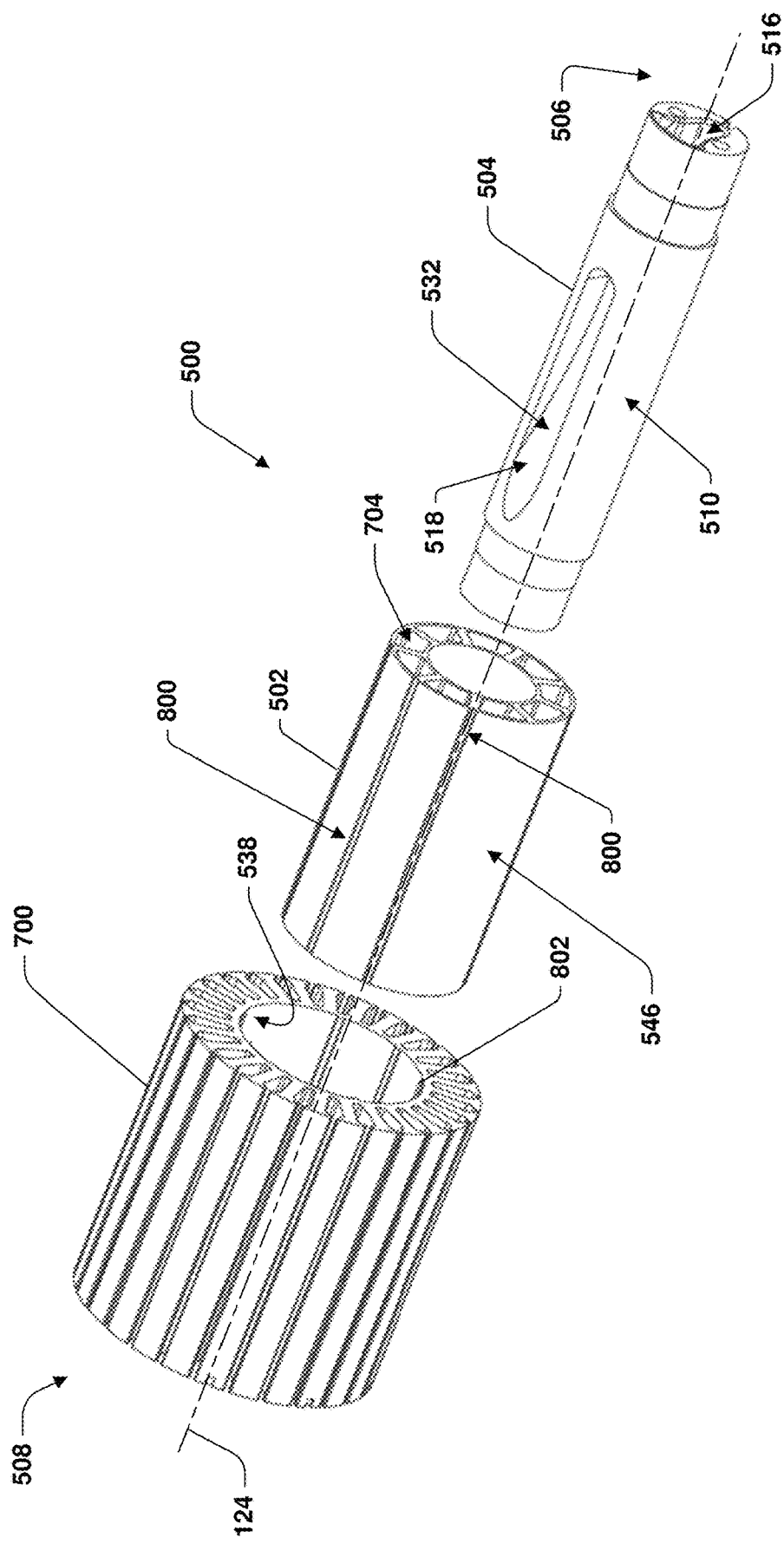
FIG. 8 is an exploded view of the components of FIG. 7.

Referring to FIG. 8, an exploded view of the components of FIG. 7 is illustrated. Similar to FIG. 7, the view is taken from the first side 506 of the axle member 504. The axle member 504 defines the second axle aperture 518 at the first exterior surface 510 between the first end 506 and the second end 508. As previously discussed, the axle member 504 can define the curvilinear interior surface 532 of the second section 528 as a curved surface having a relatively long radius of curvature, or "gentle curve." This relatively long radius of curvature allows the electronic control cable 232 and its constituent wires to enjoy a greater bend radius over a relatively long axial length (e.g., the distance 600 shown in FIG. 6).

As previously discussed, the sleeve 502 defines the second exterior surface 546. In some examples, the second exterior surface 546 is clocked relative to the interior surface 538 of the stator 700 of the hub motor 200. As shown in FIG. 8, the second exterior surface 546 can define an indentation 800 which can include slots, grooves, keyways, or any other suitable structure. The indentations 800 cooperate with a projection 802 extending away from the interior surface 538 of the stator 700. Any suitable number of indentations 800 and cooperating projections 802 can be included on the second exterior surface 546 and the interior surface 538 of the stator 700. In some examples, the indentations 800 and cooperating projections 802 are spaced in an uneven distribution around the circumference such that the sleeve 502 is clocked relative to the stator 700 at a single desired relative position rather than clocked at any number of relative positions.

In some examples, the second exterior surface 546 of the sleeve 502 and the inside surface 538 of the stator 700 can be configured to enable a friction fit or a press fit attachment of the sleeve 502 to the stator 700. The press fit or friction fit is not required, and any other suitable tolerance regime is satisfactory.

Figure 9:
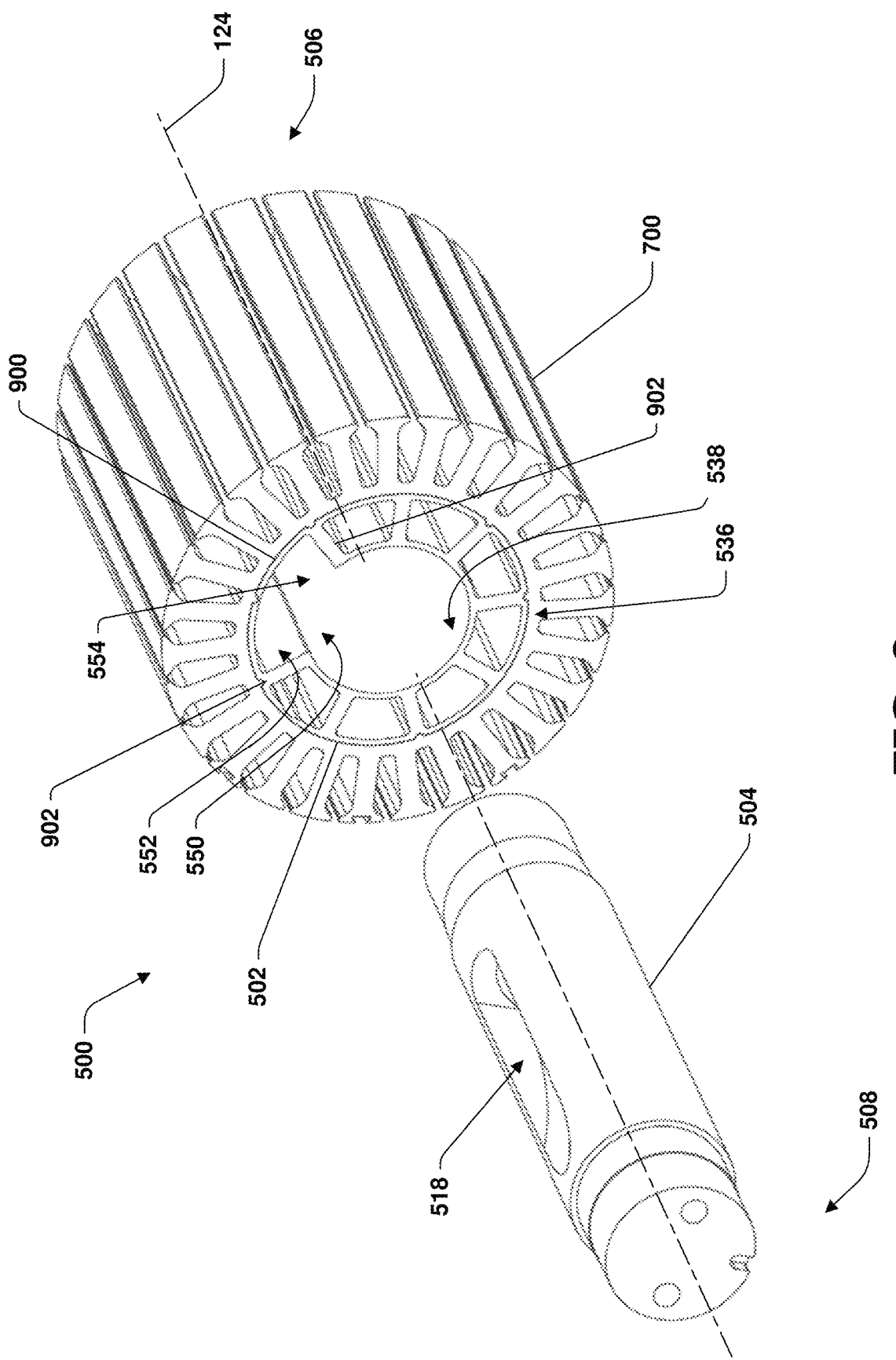
FIG. 9 is a partial exploded view of the components of FIG. 7, the view taken from a second side of the hub motor.

Referring to FIG. 9, a partial exploded view of the components of FIG. 7 is illustrated. The view is taken from the second side 508 of the axle member 504. The first sleeve aperture 552 is defined at the fourth end 536 of the sleeve 502 and enables fluid communication with the second passage 550 of the sleeve 502. As shown in FIG. 9, as the axle 504 is placed into the sleeve 502, the second sleeve aperture 554 is configured to align with the second axle aperture 518. This alignment enables the end portion 316 or an intermediate length of the electronic control cable 232 to pass out of the axle 504 through the second axle aperture 518, into the sleeve 502 through the second sleeve aperture 554, through the second passage 550, and finally exit the sleeve 502 through the first sleeve aperture 552. This described pathway enables a portion of the electronic control cable 232 to pass through the axle 504 and the sleeve 502 on a path toward connectors located on the stator 700.

In some examples, the second sleeve aperture 554 is defined by a discontinuous interior surface 538 of the sleeve 502 over a portion of the axial length 540. Again, each of the axle 504 and the sleeve 502 cooperate to define a pathway for the electronic control cable 232 to have relatively long radius of curvature over relatively long axial lengths to ease assembly and disassembly of the hub motor 200. As further shown in FIG. 9, the second passage 550 can be defined, at least in part, by an exterior cylindrical wall 900 of the sleeve 502 and at least one interior radial wall 902. In some examples, the second passage 550 can be created by simply removing a length of the interior surface 538 between any two of the interior radial walls 902.

Figure 10:
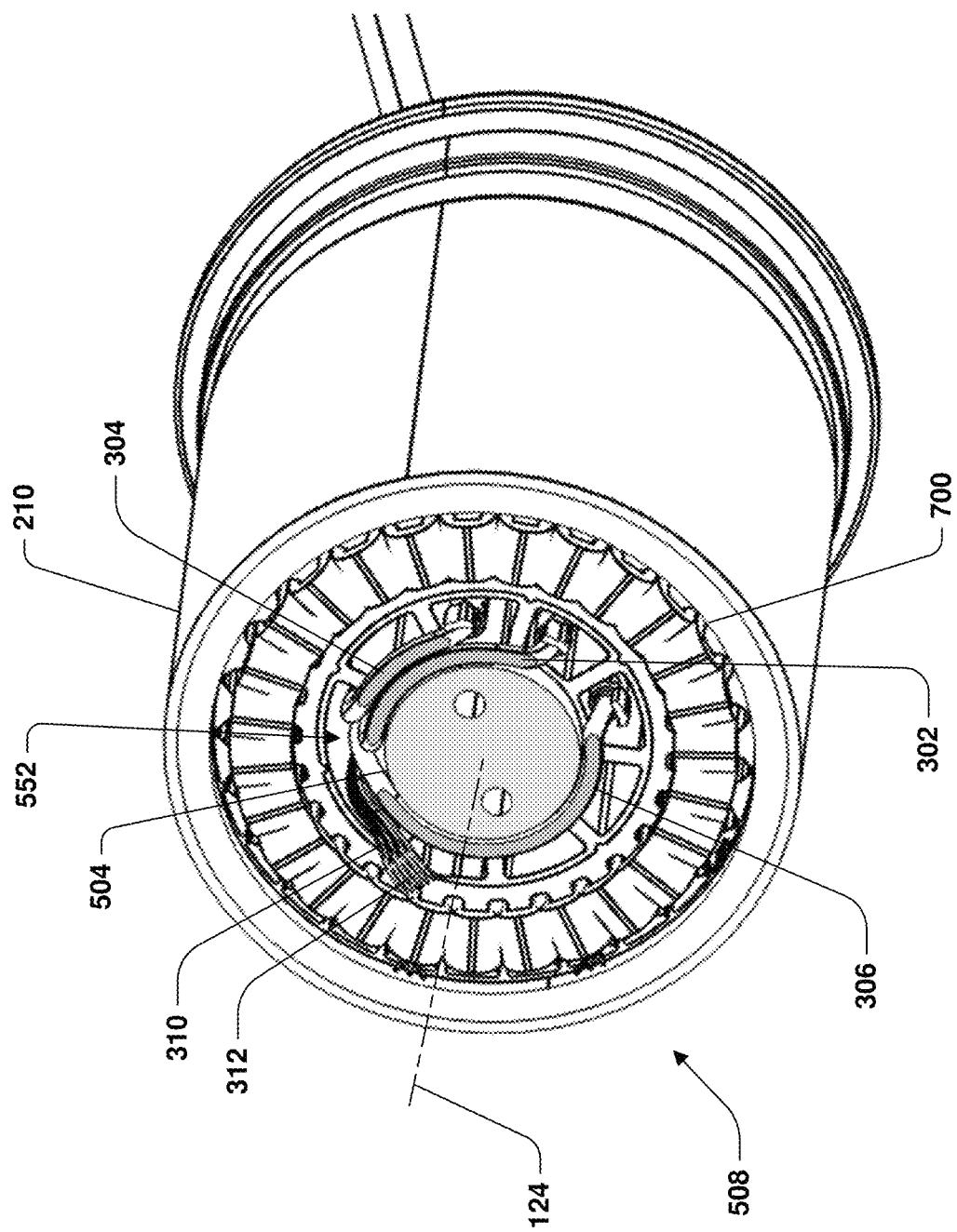
FIG. 10 is a cross-section view of the hub motor, the axle, and the wheel of FIG. 2 taken along line 10-10 of FIG. 2 showing electrical terminal locations of the electronic control cable.

Referring to FIG. 10, a cross-section view of the hub motor 200 as viewed from the second end 508 along line 10-10 of FIG. 2 is illustrated. Each of the wires 302, 304, 306, 310 of the electronic control cable 232 are shown connected to a cooperating connector on the stator 700. As previously discussed, each of the wires 302, 304, 306 provides electrical communication between electronic controller(s) within the deck portions 108, 110 (shown in FIG. 1) and a set of stator windings of one phase of the three-phase hub motor 200. As shown, each of the wires 302, 304, 306, 310 can exit the first sleeve aperture 552 at a greater radial distance than the first distance 512 from the central axis 124 of the first exterior surface 510 of the axle 504. The wires 302, 304, 306 can then wrap around the axle 504 as shown on their prescribed path to their respective connectors on the stator 700. This exit path for the wires 302, 304, 306, 310 can be beneficial to limit the axial length of the axle 504 and other components, as the wires 302, 304, 306, 310 can be routed away from surfaces for bearing mounts (not shown in the cross-section view of FIG. 10). Additionally, the wires 302, 304, 306, 310 are not routed to an end surface of the axle 504 which may provide additional complications for assembly and disassembly. As shown in FIG. 10, the three motor phase wires 302, 304, 306 from the electronic control cable 232 are each connected to their respective cooperating stator connectors located on the stator 700.

Figure 11:
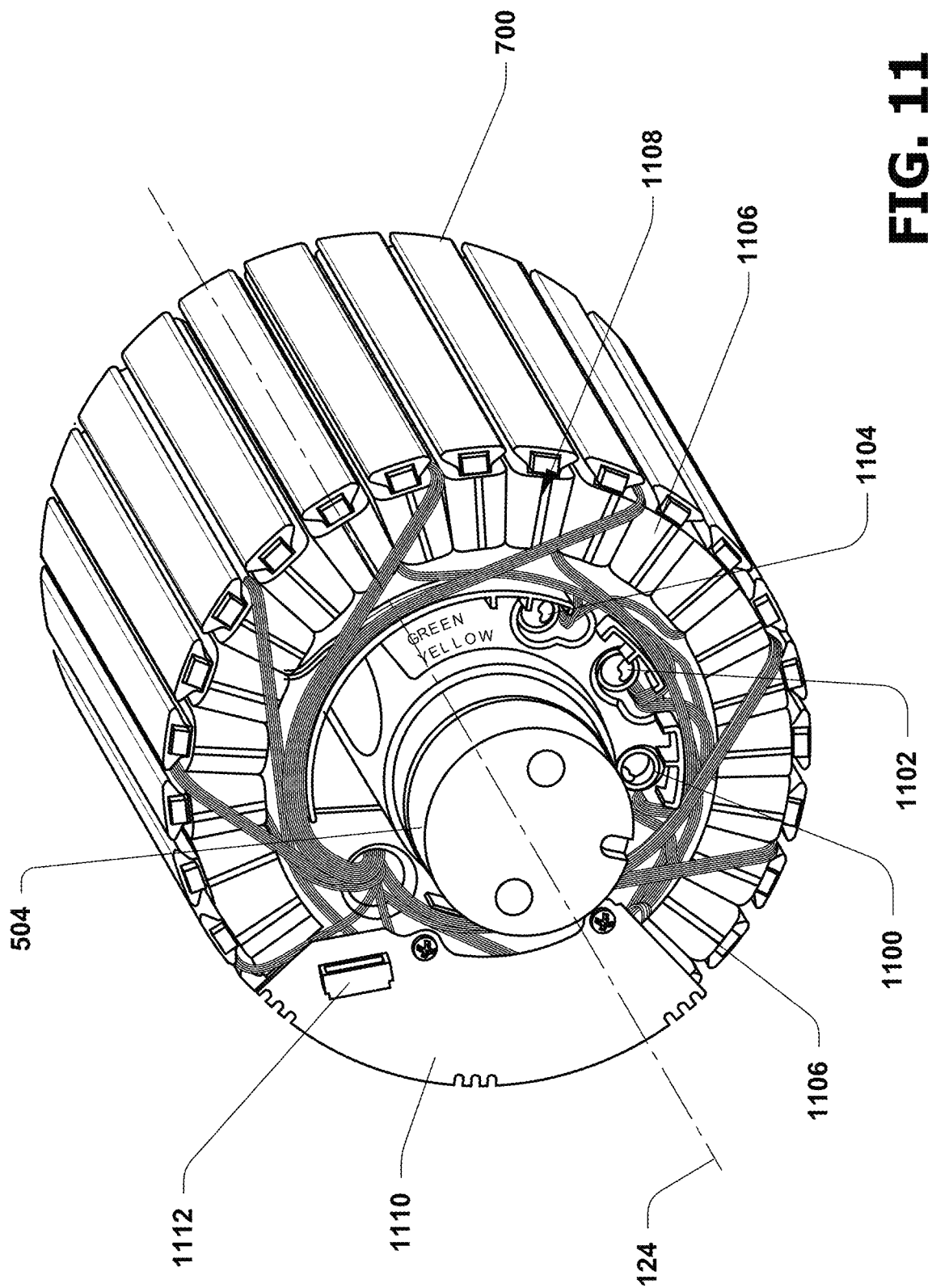
FIG. 11 is similar to FIG. 10 with the electronic control cable removed.

Referring to FIG. 11, a partial assembly view of the stator 700, the sleeve 502 (substantially hidden), and the axle 504 as viewed from the second end 508 is illustrated with the electronic control cable 232 removed for clarity. As shown in FIGS. 10, the three motor phase wires 302, 304, 306 from the electronic control cable 232 are each connected to their respective cooperating stator connectors. As shown in FIG. 11, the stator connectors 1100, 1102, 1104 located on the stator 700. The stator connectors 1100, 1102, 1104 are further connected to wires leading to each of the three phase motor windings 1106 as they alternate around the stator 700. As shown in FIGS. 10 and 11, the stator connectors 1100, 1102, 1104 are located at a distance from the central axis 124 that is less than the outside diameter 560 (shown in FIG. 5) of the sleeve 502. This location can have the beneficial effect of increasing the axial length of the stator assembly. In some known embodiments, the stator connectors 1100, 1102, 1104 are mounted at a location such as a surface 1108 of the stator windings 1106, thereby decreasing the potential axial dimension of various components of the electric vehicle 100, such as the stator 700.

In some examples, a printed circuit board (PCB) 1110 is mounted at a location such as the surface 1108 and is provided with a connector 1112 configured to cooperate with connector 312 of the electronic control cable 232. The connector 1112 can provide suitable electrical connections for a number of wires or cables that can be included in wire 310 configure to communicate electrical signals from components including, but not limited to Hall sensors, temperature sensors and the like. As has been described, wire 310 can be fed through the axle 504 with wires 302, 304, 306.

Figure 12:
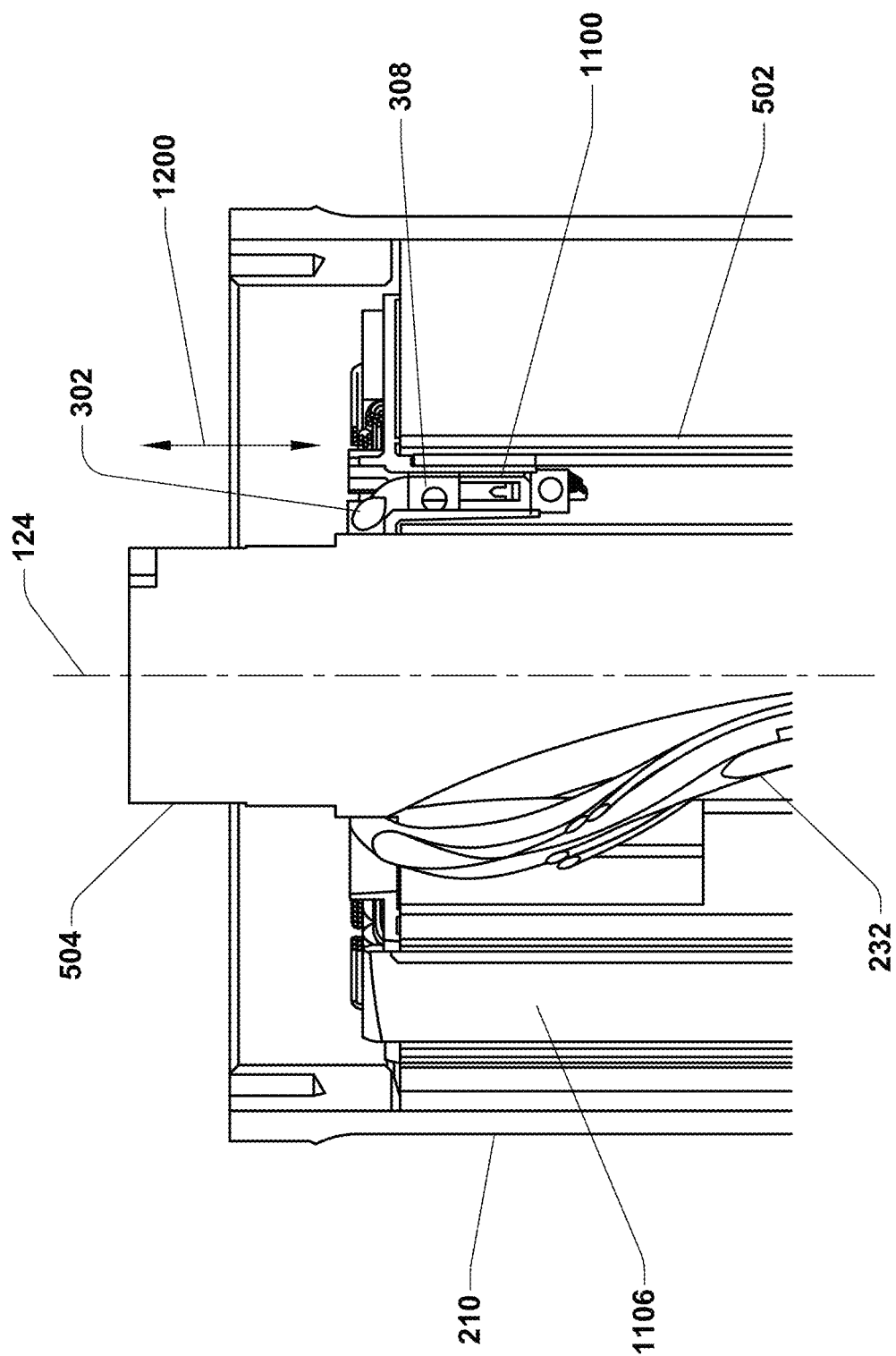
FIG. 12 is a detail cross-section view of the hub motor, the axle, and the wheel of FIG. 2 taken along line 4-4.

Referring to FIG. 12, a detail cross-section view of the hub motor 200, the axle 504, and the wheel 210 is illustrated. The stator connector 1100 can be oriented to have a major axis parallel to the central axis 124. In this orientation, engagement and disengagement of the connector 308 (e.g., a male bullet connector) with the stator connector 1100 (e.g., a female bullet connector) can be accomplished by an operator urging the connector 308 in a direction 1200 parallel or nearly parallel with the central axis 124. This parallel operating direction 1200 can ease the assembly and disassembly processes. FIG. 12 also shows the relatively long radius of curvature or gentle curve of the electronic control cable 232 as it passes through and out of the axle 504 and the sleeve 502.

Figure 13:
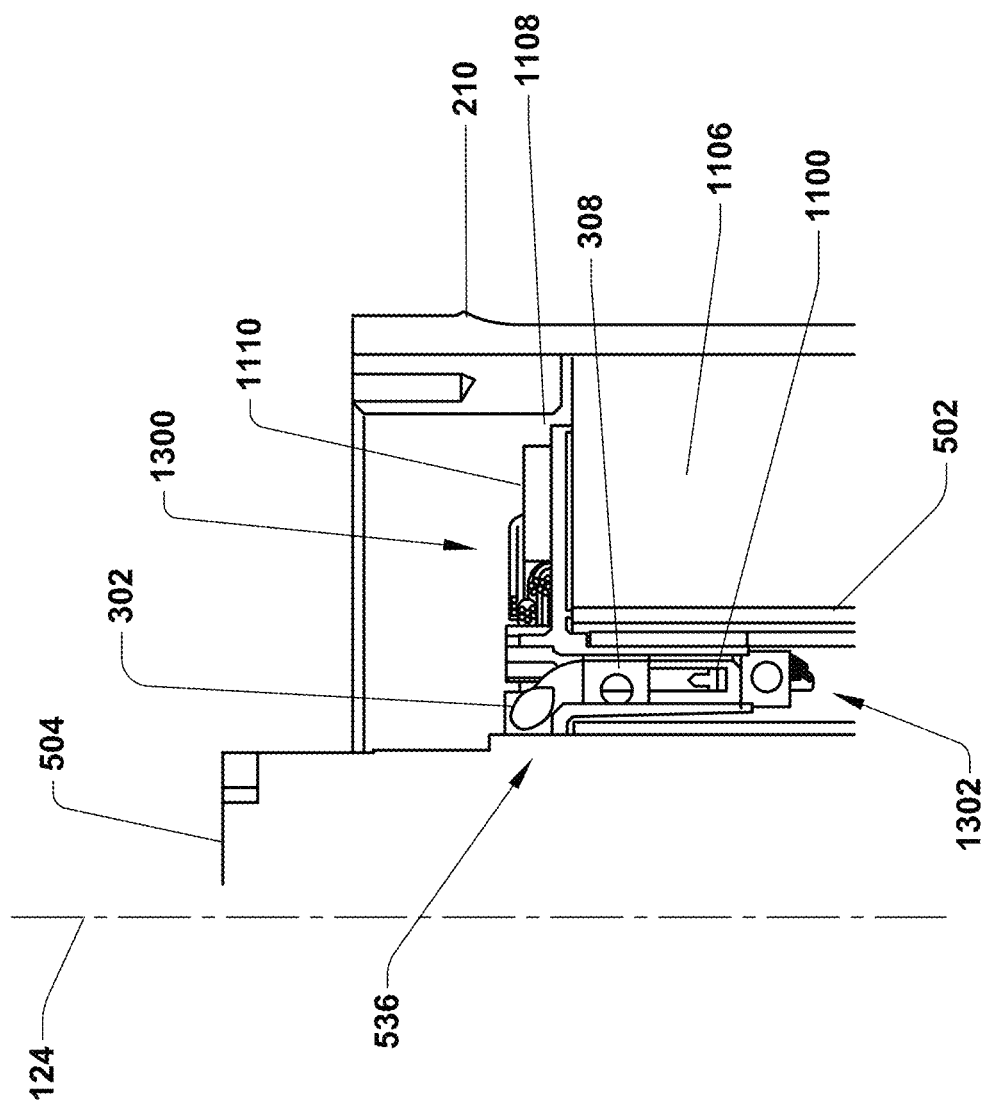
FIG. 13 is similar to FIG. 12 showing portions of the electronic control cable relative to a location of a printed circuit board.

Referring to FIG. 13, a detailed cross-section view similar to FIG. 12 is illustrated showing a portion of the wire 302 relative to a location of the printed circuit board 1110. As previously described, the wires 302, 304, 306 can be run through the axle 504 and the sleeve 502 in order to place the stator connector 1100 within the outside dimensions of the sleeve 502 and within the axial length 540 of the sleeve 502. This location can, as noted, move the stator connector away from the general area of arrow 1300 and help maximize an axial length of several components of the electric vehicle 100, including the stator 700. More simply stated, removal of the stator connector 1100 from the general area of arrow 1300 frees the surrounding volume to be filled with an increased axial length of the stator 700.

The comparison of the location of wire 302 and the printed circuit board 1110 in FIG. 13 demonstrates a required decrease of the axial dimension of the stator 700 (given the same hub axial length) if the stator connector 1100 was located on the surface where the printed circuit board 1110 is shown. However, if an increase in the axial length of the stator 700 is not desired, the described connectors can remain outboard of the stator windings while still adhering to the spirit of the disclosed structures and methods.

FIG. 13 also helps illustrate the sleeve 502 defines a volume 1302 at least partially bound by the fourth end 536 of the sleeve 502. The volume 1302 is also at least partially bound by a number of walls that define the axial passages 704 of the sleeve 502 as shown in FIG. 7. The volume 1302 can be configured to contain the end portion 316 of the electronic control cable 232 or an intermediate length of the electronic control cable 232. The volume 1302 is configured to enable the end portion 316 or an intermediate length of the electronic control cable 232 to pass out of the sleeve 502, wrap around the axle 504 (if needed) and then pass back into another portion of the sleeve 502 for connection with the stator connector 1100. The same description applies to wires 304, 306. In examples where the electronic control cable 232 passes back into another portion of the sleeve 502 for connection with the stator connector 1100, all portions of the electronic cable 232 outboard of the first sleeve aperture 552 (i.e., after the electronic control cable 232 has exited the axle member 504 and the sleeve 502) would be considered to be in the volume outside the fourth end 536 of the sleeve 502.

Figure 14:
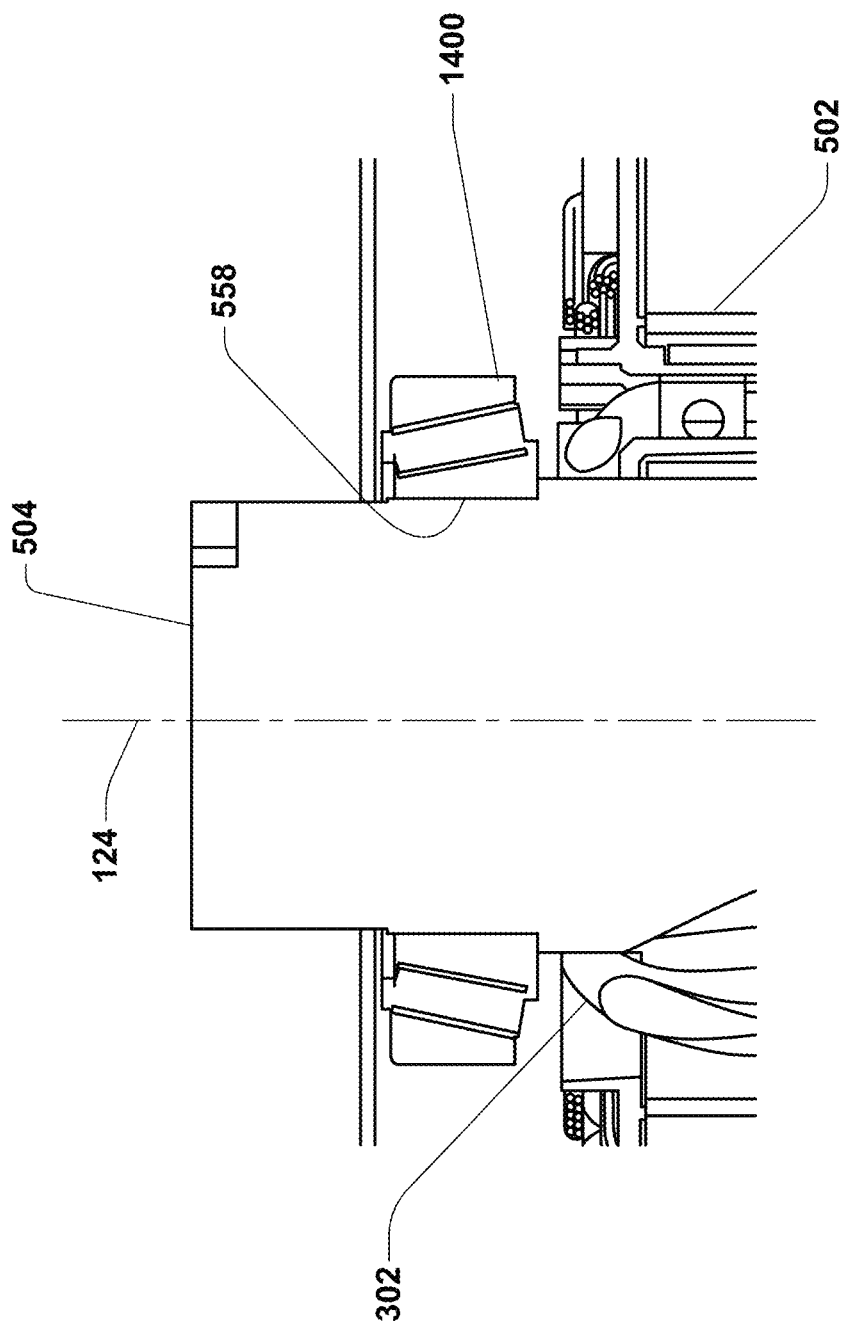
FIG. 14 is similar to FIG. 12 showing a mounting structure at an end of the axle.
Figure 15:
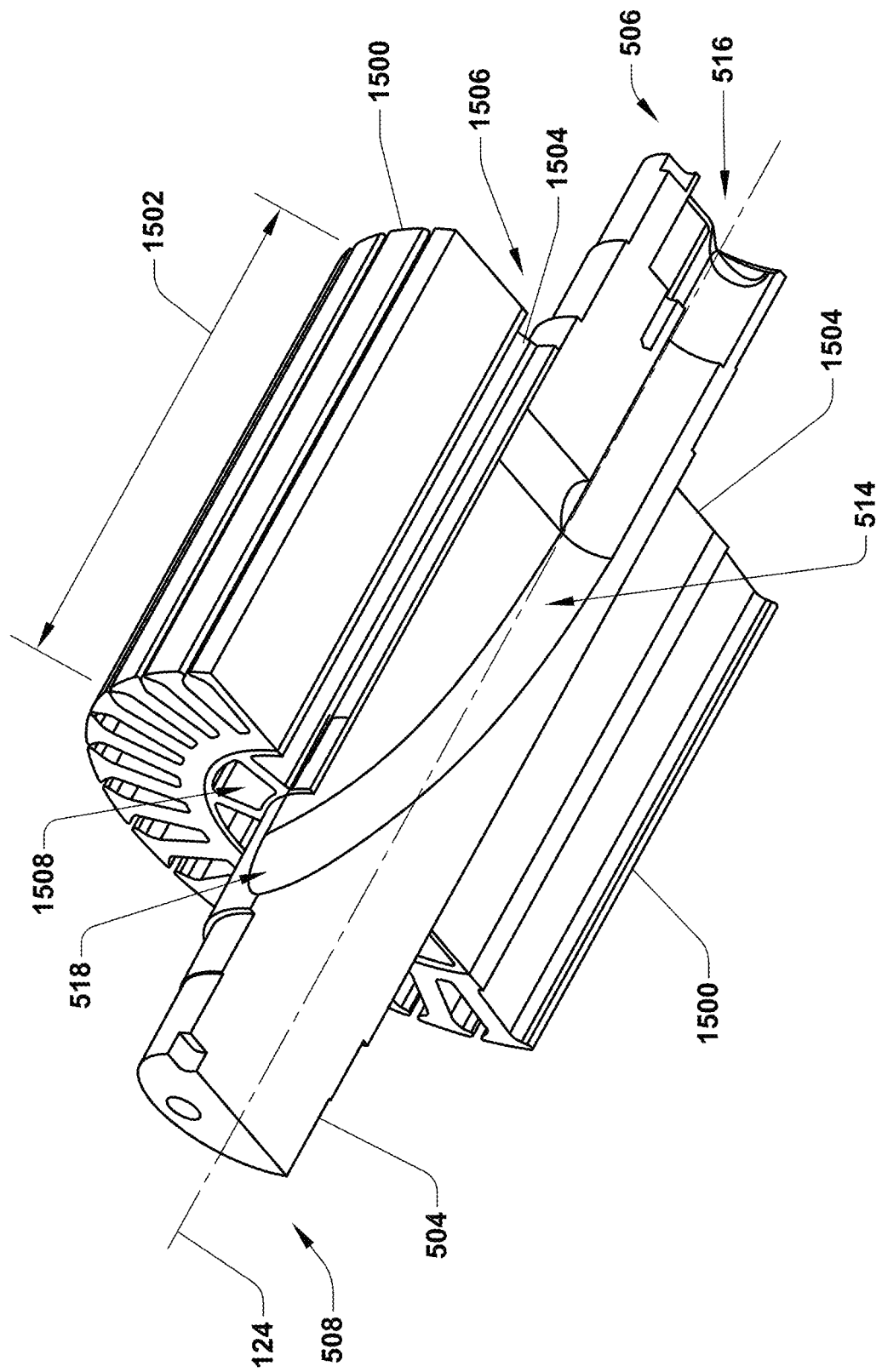
FIG. 15 is a cross-section view of a third embodiment of the axle of FIG. 2 taken along line 4-4.

Referring to FIG. 14, a cross-section view similar to FIG. 12 showing the second mounting structure 558 at an end of the axle 504. The following details apply to the first mounting structure 556 at the opposite end of the axle 504. As previously described, the second mounting structure can be a cylindrical exterior surface configured to cooperate with a bearing 1400 to enable rotatable attachment of the axle 504 to at least one of the hub motor 200 or the hub 204. Any suitable bearing can be used, including, but not limited to, spherical bearings, needle bearings, tapered bearings, etc. This example is not meant to be limiting, and other mounting structures and methods are contemplated. The disclosed axle 504 and sleeve 502 combination enable the wire 302 to be maintained at a position where the wire 302 does not interfere with the location of the bearing 1400. Referring to FIG. 15, a cross-section view of a third embodiment of the axle member 504 for use with the hub 204 and the hub motor 200 of FIG. 2 is illustrated. In some examples, the stator 1500 of the hub motor 200 may have a shorter axial length 1502 than the axial length 540 (shown in FIG. 5) to reduce the weight and cost of lengthier stator structures. The shorter axial length 1502 of the stator 1500 enables a shorter length of a sleeve 1504, as the sleeve 1504 would not need to provide support for the now removed lengths of stator iron platens typically found in hub motors 200. In some examples, the axial length of the sleeve 1504 can be similar to or equal to the axial length 1502 of the stator 1500.

Similar to the embodiments shown in FIG. 4 and FIG. 5, the axle member 504 extends along the central axis 124 from the first end 506 to the second end 508 and defines the first passage 514. The first passage 514 extends from the first axle aperture 516 defined at the first end 506 of the axle member 504 toward the second axle aperture 518. The second axle aperture 518 is defined between a third end 1506 of the sleeve 1504 and the second end 508 of the axle member 504 such that the first passage 514 passes through the axle member 504 for at least a portion of the axial length 1502 between the third end 1506 of the sleeve 1504 and a fourth end 1508 of the sleeve 1504. In the example shown in FIG. 15, the first passage 514 passes through the axle member 504 for the entire axial length 1502 of the sleeve 1504.

As shown in FIG. 15, the associated electronic control cable 232 (shown in FIG. 3) can pass through the axle member 504 from the first axle aperture 516 to the second axle aperture 518 where the associated electronic control cable 232 can exit the first passage 514 of the axle member 504. As such, the first axle aperture 516 is in fluid communication with the second axle aperture 518 such that a volume outside the first end 506 of the axle member 504 is in fluid communication with a volume outside the fourth end 536 of the sleeve 1504.

Because the axial length 1502 of the sleeve 1504 does not extend over the second axle aperture 518, the associated electronic control cable 232 does not necessarily pass into or through the annular portion of the sleeve 1504 when passing through the center of the stator 202. Of course, portions of the associated electronic control cable 232 such as the end portion 316 of the wires 302, 304, 306, 310 and their connectors 308, 312 (shown in FIG. 3) may pass into the annular portion of the sleeve 1504 to make connections to the stator windings, a PCB 1110 of the hub motor 200, or other hub motor components. In some examples, the PCB 1110 remains mounted on surface 1108 as shown in FIG. 11, and is not mounted within the annular portion of the sleeve 1504.

As with the previously described embodiments, the shown example of the axle member 504 and the sleeve 1504 enable the associated electronic control cable 232 to pass through an axial length of at least one of the axle 202, the axle member 504, or the sleeve 502 to pass from the first side 208 of the hub motor 200 to the second side 212 of the hub motor 200. More specifically, the arrangement of FIG. 15 enables the associated electronic control cable 232 to pass through an axial length of the axle member 504 to pass from the first side 208 of the hub motor 200 to the second side 212 of the hub motor 200. This arrangement can help minimize or eliminate the undesired effects of a short radius bend in the associated electronic control cable 232 required for the associated electronic control cable 232 to exit the axle member 504 at a location relatively close to the first end 506 of the axle member 504.

Figure 16:
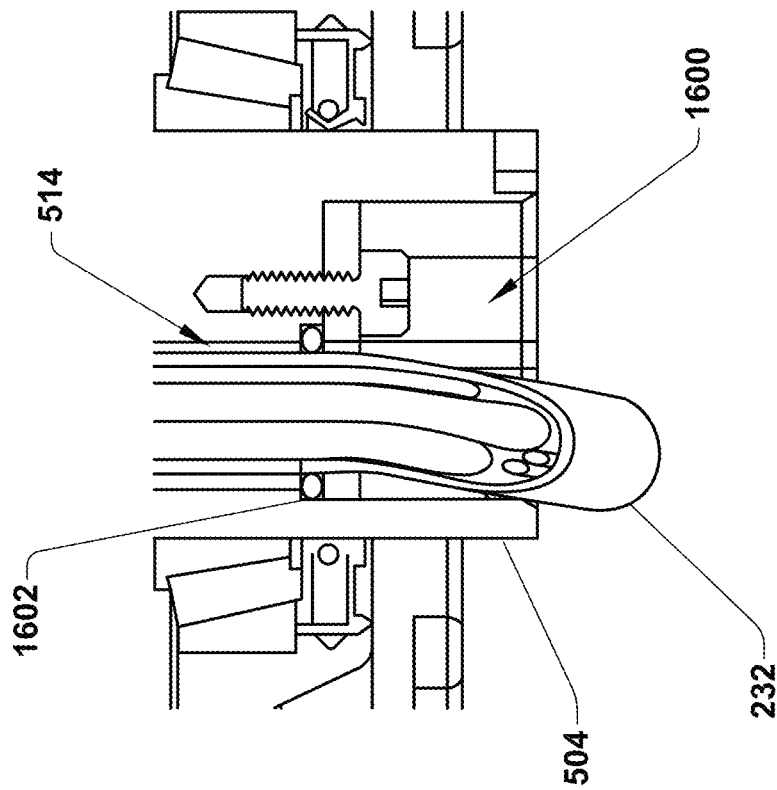
FIG. 16 is a cross-section detail of FIG. 6 showing a cap and a seal.

Referring to FIG. 16, a cross-section detail of FIG. 6 is illustrated. As previously described, some known examples of electric vehicles employing the hub motor 200 require the electronic control cable 232 to enter a passage in the axle, be subject to a relatively short radius bend, and exit the axle passage at a relatively short distance from the end of the axle where the electronic control cable 232 entered. This relatively difficult 90 degree or nearly 90-degree bend provides a significant challenge to sealing any gap between the axle aperture and the electronic control cable 232. One often applied solution is to apply a relatively large dollop of sealant or glue to the aperture through which the electronic control cable 232 exits the axle 504. This pile of glue or sealant then provides significant challenges to any future maintenance that requires removal or replacement of the electronic control cable 232.

As shown in FIG. 16, the axle 504 can define an aperture 1600 exterior to the first passage 514. The aperture 1600 can have a dimension that is longer than the first passage 514 such that a lip or ridge can be defined at the intersection of the first passage 514 and the aperture 1600. A seal 1602 can be placed at that lip or ridge to provide a mechanical seal or continuous contact between the electronic control cable 232 and the first passage 514. In some examples, the mechanical seal or continuous contact can include at least one of an airtight seal or a watertight seal. The seal 1602 can include any suitable type of sealing structure including, but not limited to, O-rings; extruded and cut seal profiles; flange seals; static radial seals; axial face seals; press-in-place seals; composite sealing plates; etc. In some examples, the seal 1602 can include a generally ring-shaped deformable seal. The seal 1602 can reduce or eliminate entry of moisture, dirt, and other undesirable material into the interior volume defined by the hub 204.

Figure 17:
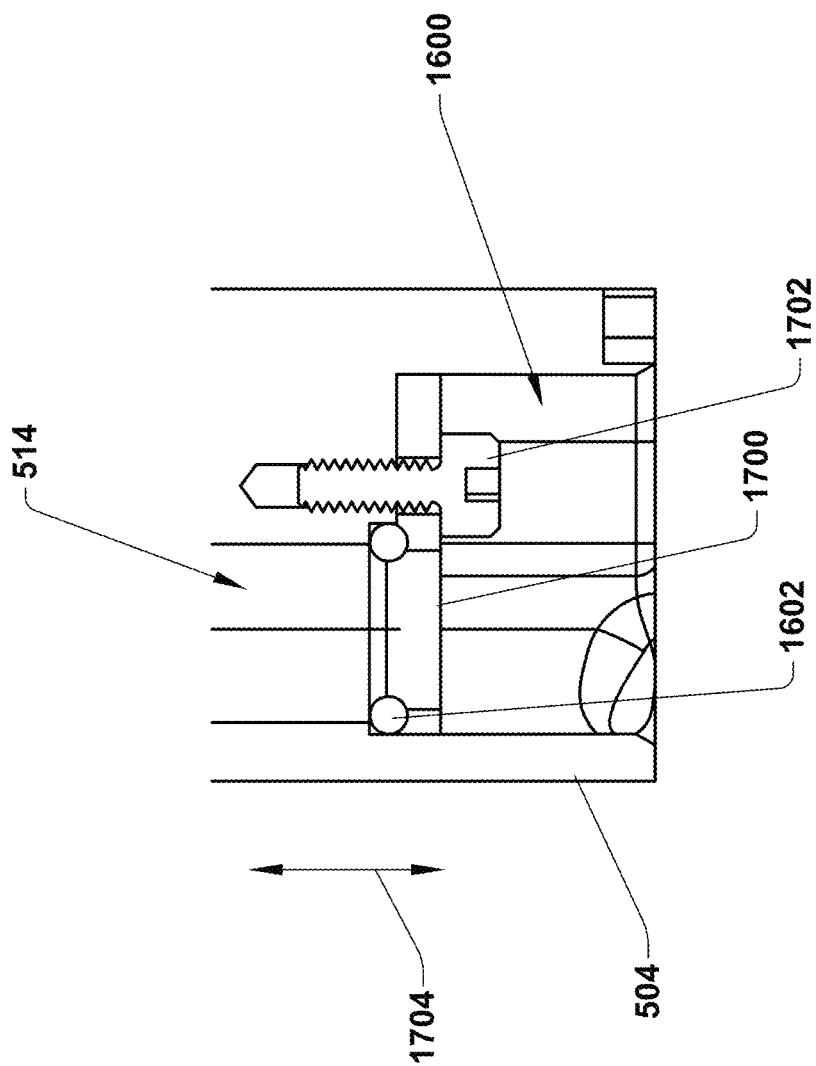
FIG. 17 is similar to FIG. 16 with several components removed for clarity.

Referring to FIG. 17, a detail view similar to FIG. 16 with several components removed for clarity is illustrated. The seal 1602 is located in the first passage 514 or at an opening of the first passage 514. As noted, the seal 1602 is configured to provide a seal between an interior wall defining the first passage 514 and the electronic control cable 232. In the shown example, an assembly can also include a cover plate 1700 that defines an aperture through which the electronic control cable 232 passes into the first passage 514. The cover plate 1700 can be fastened to the axle 504 with any suitable fastener, such as the threaded fastener 1702 as shown. The threaded fastener 1702 can be applied to urge the cover plate 1700 in the axial direction represented by arrow 1704. Motion of the cover plate 1700 toward the first passage 514 creates a force on the seal 1602 causing elastic deformation of the seal 1602. This elastic deformation urges an inside diameter of the seal 1602 into contact with the electronic control cable 232 and an outside diameter of the seal 1602 into contact with the axle 504 and the cover plate 1700. These points of contact and the force applied by the threaded fastener 1702 are configured to provide a suitable mechanical seal between the first passage 514 and the electronic control cable 232. This arrangement can provide the benefit of being removable, such that repair and replacement operations are not impeded by hardened glue or hardened sealants. This example explanation of the seal 1602 is related specifically to at least an O-ring-type seal, and it is to be understood that other suitable seals may operate in different ways.

Figure 18:
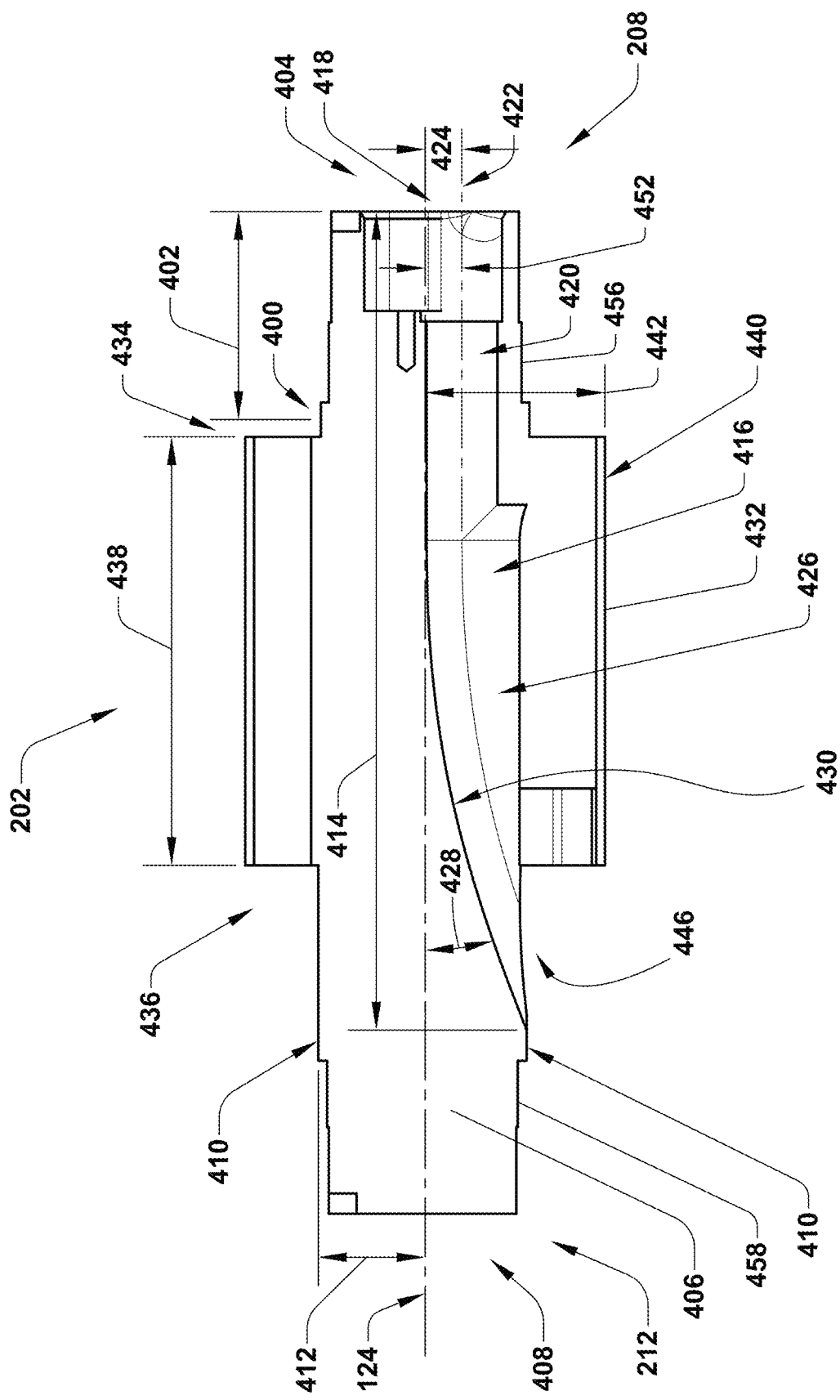
FIG. 18 is similar to FIG. 4 showing a shorter axial length sleeve.

Referring to FIG. 18, a cross-section view of another embodiment of the axle 202 taken along line 4-4 of FIG. 2 is illustrated. This embodiment of the axle 202 includes a second portion 432 having a significantly shorter length 438 over which the second portion 432 surrounds the first portion 406. Many other details of this embodiment are the similar to or the same as the embodiment shown in FIG. 4 and previously described. In the interest of brevity, the similar or same details will not be discussed a second time.

Due to the shorter axial length 438 of the second portion 432, the second aperture 446 is located on the first exterior surface 410, and the second portion 432 does not require a manufacturing process to create a passage to accommodate the electronic control cable 232. Rather, this embodiment enables an assembly process or maintenance process whereby the electronic control cable 232 is passed into the first aperture 418, moved along the interior passage 416, and urged to exit the second aperture 446 all within the first portion 406. Despite not passing through the second portion 432, the electronic control cable 232 still moves from a volume outside the first end 404 of the first portion 406, through the axle 202, and to a volume outside the fourth end 436 of the second portion 432.

As with the previously described embodiment, the first portion 406 defines the first aperture 418 at a first aperture distance 452 from the central axis 124. In the presently described embodiment, the second aperture 446 is defined by the first exterior surface 410 at a first distance 412 from the central axis 124. The first distance 412 is greater than the first aperture distance 452. As such, the electronic control cable 232 passes into the axle 202 at a first distance (the first aperture distance 452) from the central axis 124 and passes out of the axle 202 at a second distance (the first distance 452) from the central axis 124. The second distance (at exit) from the central axis 124 is greater than the first distance (at entry) from the central axis 124 as with all of the embodiments described.

The disclosed structures and methods can provide several benefits to at least one of axles, axles having outer sleeves, hub motors including the described axles, or electric vehicles using the described axles. In some examples, the present disclosure can provide the benefits of reduced cost, time, and labor involved in servicing the electric vehicle, as with many known examples, the electronic control cable either cannot be replaced, or the expense of removing the electronic control cable is too great for many consumers. The described structures can also eliminate glue or sealants used in some known hub motors and the soldered connections of known cable wires to the stator. Each of these steps can provide significant hurdles to repair and replacement of the cable.

The presently disclosed structures can enable the assembly to avoid a relatively short radius 90-degree bend in the electronic control cable at a relatively short distance after it enters the axle. This type of bend increases the general wear and tear on the cable and presents several difficulties in providing a seal at or near the 90-degree bend of the cable. The present disclosure can lessen these concerns with a smooth transition (bend) for the cable and the wires included in the cable.

The present disclosure of structures and methods can enable a significant increase in the axial length of the stator of the hub motor, as the axle bearings and other structures of known motors require a clearance distance from the cable passing out of the axle toward connections with the stator. Additionally, the described structures can also promote longer stator axial lengths, by using the annular space of the outer sleeve to house wire connectors, which may have previously been located axially outside (i.e., outboard) of the stator windings. The described structures can also promote making the PCB, the sleeve, and other motor components as compact as possible to enable the largest possible stator size (e.g., axial length) given a particular hub size.

The axle and sleeve as described can enable the cable to be unplugged at the stator connectors and removed as needed for repair service or replacement. In many known examples, the fittings attached to the ends of the individual wires of the cable cannot be forced around/through the spaces enclosing the 90-degree bend of the cable and/or the apertures in the axle are not large enough to accommodate the fittings.

Although the apparatus and methods have been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. An axle for a motor comprising:
    a first portion extending along a central axis from a first end to a second end, the first portion having a first exterior surface at a first distance from the central axis, the first portion defining a first length of an interior passage extending from a first aperture proximate the first end, the first portion defining the first aperture at a first aperture distance from the central axis;
    a second portion extending along the central axis from a third end proximate the first end of the first portion to a fourth end proximate the second end of the first portion, the second portion surrounding a length of the first portion and having a second exterior surface at a second distance from the central axis, the second distance greater than the first distance, wherein:
    at least one of the first portion or the second portion defining a second length of the interior passage extending from a second aperture proximate the second end of the first portion, the second aperture defined at a second aperture distance from the central axis, the second aperture distance greater than the first aperture distance, and
    the first aperture is in fluid communication with the second aperture such that a volume outside the first end of the first portion is in fluid communication with a volume outside the fourth end of the second portion through the interior passage defined by at least one of the first portion and the second portion;
    a first mounting structure located proximate the first end of the first portion; and
    a second mounting structure located proximate the second end of the first portion.

2. The axle of claim 1, wherein:
    the second portion defines the second aperture at a second aperture distance from the central axis.

3. The axle of claim 1, wherein the first portion defines a first section of the first length of the interior passage extending along a centerline that is parallel to the central axis.

4. The axle of claim 1, wherein the first portion defines a second section of the first length of the interior passage extending away from the central axis.

5. The axle of claim 4, wherein the first portion defines the second section of the first length of the interior passage extending away from the central axis at an angle of about 15 degrees.

6. The axle of claim 4, wherein the first portion defines the second section of the first length of the interior passage along a curvilinear path away from the central axis.

7. The axle of claim 1, wherein the second portion defines the second length of the interior passage extending along a centerline parallel to the central axis.

8. The axle of claim 1, wherein the first portion includes a cylindrical exterior surface, and the second portion includes a cylindrical exterior surface.

9. An axle for a motor comprising:
    an axle member extending along a central axis from a first end to a second end, the axle member having a first exterior surface at a first distance from the central axis, the axle member defining a first passage extending from a first axle aperture defined at the first end of the axle member toward a second axle aperture defined at the first exterior surface;
a sleeve extending along the central axis from a third end proximate the first end of the axle member to a fourth end proximate the second end of the axle member, the sleeve surrounding an axial length of the axle member and having:
an interior surface; and
a second exterior surface at a second distance from the central axis, the second distance greater than the first distance, wherein:
the second axle aperture is defined between the third end of the sleeve and the second end of the axle member such that the first passage passes through the axle member for at least a portion of the axial length between the third end of the sleeve and the fourth end of the sleeve; and
a first mounting structure located proximate the first end of the axle member; and
a second mounting structure located proximate the second end of the axle member.

10. The axle of claim 9, wherein an outside diameter of the first exterior surface of the axle member and an inside diameter of the interior surface of the sleeve enable a friction fit attachment of the sleeve to the axle member.

11. The axle of claim 9, wherein:
the sleeve defines a second passage extending from a first sleeve aperture defined at the fourth end toward a second sleeve aperture defined at the interior surface, and
the axle member and the sleeve are aligned such that the second axle aperture cooperates with the second sleeve aperture to provide fluid communication through the first passage and the second passage between the first axle aperture defined at the first end of the axle member and the first sleeve aperture defined at the fourth end of the sleeve.

12. The axle of claim 11, wherein the first passage and the second passage are configured to enable an associated electronic control cable to pass through the axle member and the sleeve from the first axle aperture to the first sleeve aperture.

13. The axle of claim 12, wherein the first passage and the second passage are configured to enable the associated electronic control cable to pass through the axle member and the sleeve to provide electronic communication between:
an electrical signal source located in a space exterior to the first axle aperture, and
an electrical connector located in a space exterior to the first sleeve aperture.

14. The axle of claim 12, further comprising:
a seal located in the first passage, the seal configured to provide continuous contact between an interior wall defining the first passage and the associated electronic control cable; and
a cap configured to apply a force in an axial direction to the seal when the cap is attached to the axle member.

15. The axle of claim 12, wherein the sleeve defines a volume at least partially bound by the fourth end of the sleeve, the volume configured to contain an end portion of the associated electronic control cable.

16. The axle of claim 9, wherein an axle member rotational position about the central axis relative to the sleeve is clocked.

17. An electric vehicle comprising:
a board frame including a chassis, a first deck portion, and a second deck portion, wherein the chassis supports the first deck portion and the second deck portion, each of the first and second deck portions configured to receive a left foot or a right foot of a rider oriented generally perpendicular to a direction of travel of the board frame;
a hub motor configured to rotate a ground-contacting wheel to propel the electric vehicle, the hub motor defining a central aperture extending along a central axis from a first side to a second side;
an axle member attached to the hub motor, the axle member extending along the central axis within the central aperture from a first end to a second end and defining a passage extending from a first axle aperture defined at the first end of the axle member toward a second axle aperture defined at a surface between the first end and the second end, wherein:
the first axle aperture defined at a first distance from the central axis, and
the second axle aperture defined at a second distance from the central axis, the second distance being greater than the first distance;
a first hub motor frame mount attached to the first end of the axle member; and
a second hub motor frame mount attached to the second end of the axle member, the first hub motor frame mount and the second hub motor frame mount attaching the board frame to the axle member and the hub motor.

18. The electric vehicle of claim 17, further comprising:
a sleeve extending along the central axis, the sleeve surrounding an axial length of the axle member and attached to the hub motor, the sleeve defining a length of the passage; and
an electronic control cable passing through the axle member and the sleeve from the first axle aperture at a first hub motor side to the second hub motor side for connection to a stator or hub motor electronics.

19. The electric vehicle of claim 18, further comprising a controller within the board frame, wherein the electronic control cable is in electrical communication with the controller and the hub motor to enable an electrical signal to pass from the controller to the hub motor.

20. The electric vehicle of claim 18, wherein the sleeve has an outside diameter configured to be friction fit within the central aperture of the hub motor.

* * * * *